United States Patent
So et al.

(10) Patent No.: US 9,504,369 B2
(45) Date of Patent: Nov. 29, 2016

(54) CLEANING ROBOT AND CONTROL METHOD THEREOF

(71) Applicant: Samsung Electronics Co., Ltd., Suwon-si (KR)

(72) Inventors: Jea Yun So, Suwon-si (KR); Sang Sik Yoon, Gimpo-Si (KR); Joon Hyung Kwon, Seoul (KR); Shin Kim, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/273,069

(22) Filed: May 8, 2014

(65) Prior Publication Data

US 2014/0336863 A1   Nov. 13, 2014

(30) Foreign Application Priority Data

May 10, 2013   (KR) .......................... 10-2013-0053464

(51) Int. Cl.
   *A47L 11/40*   (2006.01)
   *A47L 9/28*   (2006.01)
   *G05D 1/02*   (2006.01)

(52) U.S. Cl.
   CPC .......... *A47L 11/4061* (2013.01); *A47L 9/2815* (2013.01); *A47L 9/2852* (2013.01); *G05D 1/0219* (2013.01); *G05D 1/0246* (2013.01); *A47L 2201/04* (2013.01); *A47L 2201/06* (2013.01); *G05D 2201/0203* (2013.01)

(58) Field of Classification Search
   CPC ........... A47L 11/4061; A47L 2201/06; A47L 2201/04; A47L 9/2852; A47L 9/2815; B60T 8/17551; G05D 1/0219; G05D 1/0246; G05D 2201/0203
   See application file for complete search history.

(56) References Cited

U.S. PATENT DOCUMENTS

| 5,400,244 A | 3/1995 | Watanabe et al. | |
| 5,622,236 A | 4/1997 | Azumi et al. | |
| 7,920,941 B2 * | 4/2011 | Park et al. | 700/259 |
| 8,073,233 B2 * | 12/2011 | Kanda | 382/133 |
| 2002/0091466 A1 * | 7/2002 | Song | A47L 9/009 |
| | | | 700/245 |

(Continued)

FOREIGN PATENT DOCUMENTS

| CN | 101408941 | | 4/2009 | |
| EP | 1715398 | | 10/2006 | |
| EP | 2325714 | | 5/2011 | |
| KR | 20040039093 A | * | 5/2004 | ............. A47L 9/009 |
| KR | 100833125 B1 | * | 5/2008 | |
| KR | 20090018336 A | * | 2/2009 | |
| WO | 2012/008703 | | 1/2012 | |

OTHER PUBLICATIONS

Extended European Search Report dated Nov. 21, 2014 in European Patent Application No. 14167336.8.

*Primary Examiner* — Rodney Butler
(74) *Attorney, Agent, or Firm* — Staas & Halsey LLP

(57) ABSTRACT

A cleaning robot may have a body, a moving unit provided on the body to move the body in a cleaning space, a cleaning unit provided on the body to clean a floor of the cleaning space, a floor image obtaining unit configured to obtain a floor image of the cleaning space, and a control unit configured to determine if foreign substance is present on the floor of the cleaning space based on the floor image, and control the moving unit to move the body to a position of the foreign substance, in which the cleaning robot, by obtaining an image of a floor to be cleaned, detects the foreign substance that is not positioned on a moving track of the cleaning robot, and when the foreign substance is detected, moves to the position of the foreign substance to perform a cleaning.

16 Claims, 26 Drawing Sheets

(56) References Cited

U.S. PATENT DOCUMENTS

| | | | |
|---|---|---|---|
| 2002/0153855 A1* | 10/2002 | Song et al. | 318/568.12 |
| 2005/0171644 A1* | 8/2005 | Tani | 700/253 |
| 2005/0192707 A1* | 9/2005 | Park | A47L 9/281 |
| | | | 700/259 |
| 2010/0328319 A1* | 12/2010 | Ikenoue | 345/474 |
| 2011/0202175 A1* | 8/2011 | Romanov et al. | 700/250 |
| 2012/0103367 A1* | 5/2012 | Tang | 134/18 |
| 2012/0169497 A1 | 7/2012 | Schnittman et al. | |
| 2013/0066199 A1* | 3/2013 | Ramanujan | A61B 5/0071 |
| | | | 600/431 |
| 2014/0124004 A1* | 5/2014 | Rosenstein | A47L 9/2852 |
| | | | 134/18 |
| 2014/0257562 A1* | 9/2014 | Lee et al. | 700/255 |
| 2014/0289992 A1* | 10/2014 | Ziegler et al. | 15/320 |
| 2015/0120128 A1* | 4/2015 | Rosenstein | A47L 9/2852 |
| | | | 701/28 |

* cited by examiner

CLEANING ROBOT AND CONTROL METHOD THEREOF

CROSS-REFERENCE TO RELATED APPLICATIONS

This application claims the priority benefit of the Korean Patent Application No. 10-2013-0053464, filed on May 10, 2013, in the Korean Intellectual Property Office, the disclosure of which is incorporated herein by reference.

BACKGROUND

1. Field

Embodiments relate to a cleaning robot and a control method thereof, and more particularly, to a cleaning robot for detecting dust by using a front camera and a control method thereof.

2. Description of the Related Art

A cleaning robot is an apparatus configured to automatically clean a space to be cleaned by suctioning foreign substance, such as dust, accumulated on a floor while moving on the space to be cleaned with no manipulation of a user. That is, the cleaning robot is configured to clean a space to be cleaned while moving on the space.

A conventional cleaning robot is provided with a dust detecting device to detect whether dust is introduced or the amount of dust. In a conventional cleaning robot, the conventional dust detecting device is configured to detect whether dust is introduced into a dust container or the amount of dust in the dust container only after the dust on a floor to be cleaned is swept up by a brush. Thus, the cleaning robot is needed to be moved to a particular area to suction dust in order to determine the presence of the dust or the amount of the dust. That is, the conventional cleaning robot is not able to recognize dust even in a case when the dust is accumulated immediately next to a moving track of the cleaning robot unless the dust is accumulated on the moving track of the cleaning robot.

SUMMARY

In an aspect of one or more embodiments, there is provided a cleaning robot capable of detecting dust accumulated around the cleaning robot while moving along a moving track, and clean the detected dust by moving first to the area at which the dust is detected.

In accordance with an aspect of one or more embodiments, there is provided a cleaning robot includes a body, a moving unit, a cleaning unit, a floor image obtaining unit and a control unit. The moving unit may be provided on the body to move the body in a cleaning space. The cleaning unit may be provided on the body to clean a floor of the cleaning space. The floor image obtaining unit may be configured to obtain a floor image of the cleaning space. The control unit may be configured to determine if foreign substance is present on the floor of the cleaning space based on the floor image, and control the moving unit to move the body to a position of the foreign substance.

The control unit may extract a floor area from the floor image, and extract an image of the foreign substance from the extracted floor area.

The control unit may extract the floor area from the floor image by using a watershed algorithm that uses a marker.

The control unit may extract the image of the foreign substance by using an edge extracting algorithm.

During a cleaning mode, the control unit may control the floor image obtaining unit and the cleaning unit to obtain the floor image and clean the floor of the cleaning space while the body is moving.

During the cleaning mode, the control unit may generate a moving track along which the body moves, based on a width of the body.

During a scout mode, the control unit may control the floor image obtaining unit to obtain the floor image while the body is moving.

During the cleaning mode, the control unit may generate a moving track, along which the body moves, based on a vision of the floor image obtaining unit.

The control unit may control the moving unit and the cleaning unit to perform a concentrated cleaning on the position of the foreign substance at the time of when the cleaning robot is arrived at the position of the foreign substance.

The control unit may control the moving unit to move the body to the position of the foreign substance in a case when a distance between the body and the foreign substance is equal to or less than a predetermined distance.

In an aspect of one or more embodiments, there is provided a method of controlling a cleaning robot configured to clean a cleaning space includes obtaining an image of a floor of the cleaning space while moving in the cleaning space, determining whether foreign substance is present on the floor of the cleaning space based on the image obtained, moving the cleaning robot to a position of the foreign substance if determined that the foreign substance is present, and cleaning the foreign substance when arrived at the position of the foreign substance.

The moving of the cleaning robot to the position of the foreign substance may include moving the cleaning robot to the position of the foreign substance in a case when a distance between the body and the foreign substance is equal to or less than a predetermined distance.

The determining of whether foreign substance is present on the floor of the cleaning space may include extracting a floor area from the image, and extracting an image of the foreign substance from the extracted floor area.

The extracting of the floor area may include extracting a floor area from the floor image by using a watershed algorithm that uses a marker.

The extracting of an image of the foreign substance may include extracting an image of the foreign substance by using an edge extracting algorithm.

In an aspect of one or more embodiments, there is provided a cleaning robot includes a body, a moving unit, a cleaning unit, and an image obtaining unit. The moving unit may be provided on the body to move the body. The cleaning unit may be provided on the body to clean a floor of a cleaning space. The image obtaining unit may be configured to obtain a floor image of the cleaning space. In a case when foreign substance is detected from the floor image obtained by the image obtaining unit while the body is moving in the cleaning space, the body may move toward the foreign substance.

When the body is arrived at a position of the foreign substance, the cleaning unit may clean the detected foreign substance.

In a case when a distance between the body and the foreign substance is equal to or less than a predetermined distance, the body may move toward the foreign substance.

During a cleaning mode, the cleaning unit may clean the floor of the cleaning space while the body is moving.

During the cleaning mode, the body may move along a first moving track that is generated based on a width of the body.

During a scouting mode, the cleaning unit may not perform a cleaning on the floor of the cleaning space while the body is moving.

During the scouting mode, the body may move along a second moving track that is generated based on a vision of the image obtaining unit As is apparent from the above, by obtaining an image of a floor of a cleaning space, foreign substance that is not positioned on a moving track of a cleaning robot is detected, and when the foreign substance is detected, the cleaning robot may be able to move to the position of the foreign substance to perform a cleaning.

BRIEF DESCRIPTION OF THE DRAWINGS

These and/or other aspects of embodiments will become apparent and more readily appreciated from the following description of embodiments, taken in conjunction with the accompanying drawings of which.

DETAILED DESCRIPTION

Figure 1:
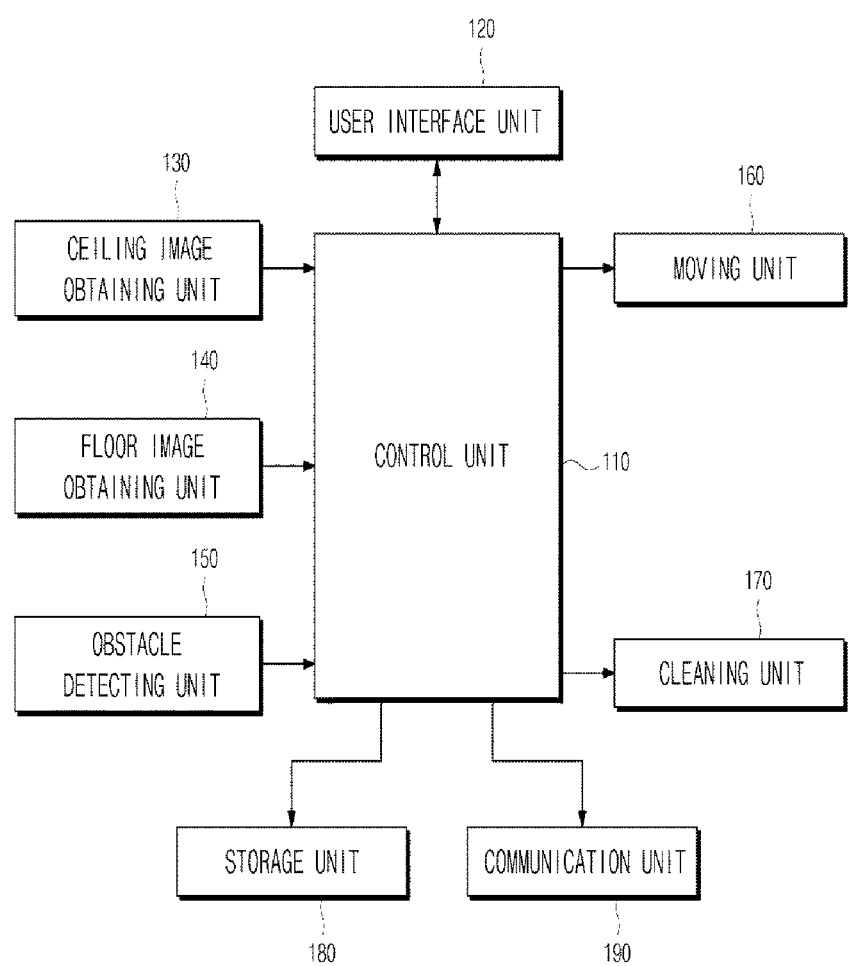
FIG. 1 is a block diagram illustrating a configuration of a cleaning robot in accordance with an embodiment.

Reference will now be made in detail to embodiments of the present disclosure, examples of which are illustrated in the accompanying drawings, wherein like reference numerals refer to like elements throughout.

Figure 2:
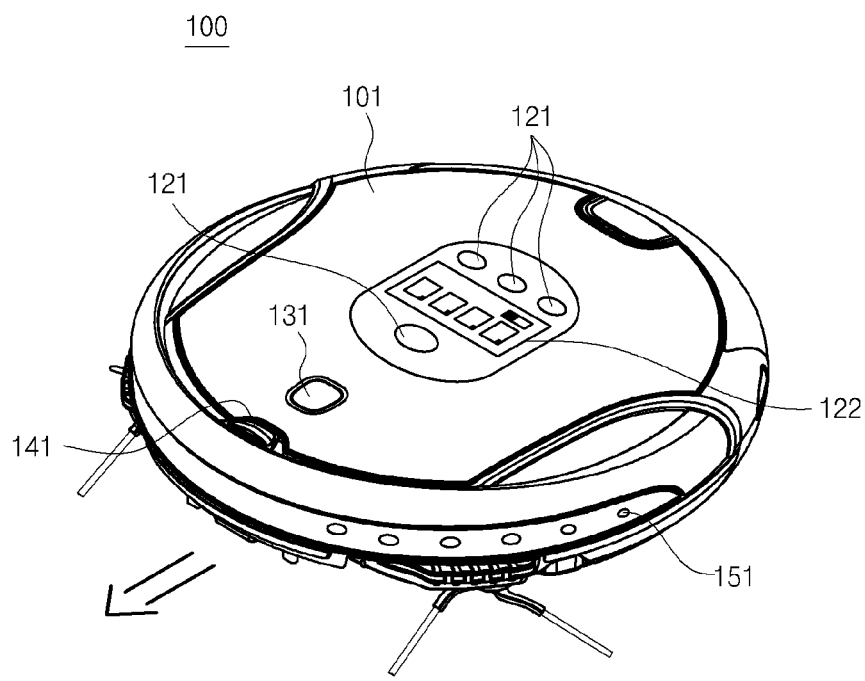
FIG. 2 is a drawing illustrating an external appearance of the cleaning robot in accordance with an embodiment.
Figure 3:
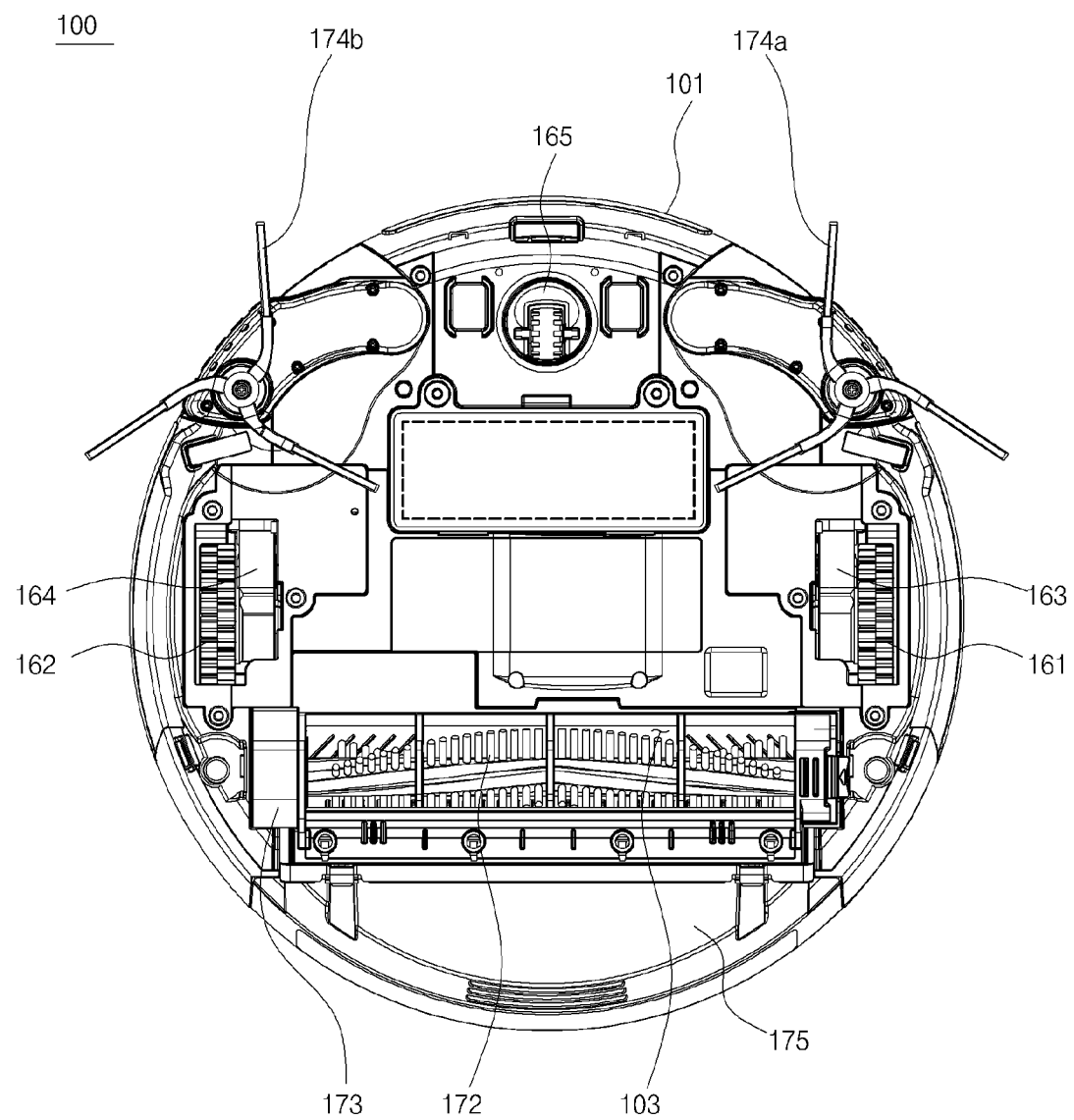
FIG. 3 is a drawing illustrating a bottom surface of the cleaning robot in accordance with an embodiment.

FIG. 1 is a block diagram illustrating a configuration of a cleaning robot in accordance with an embodiment, FIG. 2 is a drawing illustrating an external appearance of the cleaning robot in accordance with an embodiment, and FIG. 3 is a drawing illustrating a bottom surface of the cleaning robot in accordance with an embodiment.

Referring to FIGS. 1, 2, and 3, a cleaning robot 100 includes a user interface unit 120 to receive an operation command with respect to the cleaning robot 100 from a user and display operation information of the cleaning robot 100, a ceiling image obtaining unit 130 to obtain an image of a ceiling of a cleaning space to be cleaned, a floor image obtaining unit 140 to obtain an image of a floor to be cleaned, an obstacle detecting unit 150 to detect an obstacle within the cleaning space, a moving unit 160 to move a body 101 of the cleaning robot 100, a cleaning unit 170 to clean a floor to be cleaned, a storage unit 180 to store a program and data related to an operation of the cleaning robot 100, a communication unit 190 to communicate with an external device, and a control unit 110 to control an operation of the cleaning robot 100.

The user interface unit 120 is provided at an upper surface of the body 101 of the cleaning robot 100 that is provided to form an external appearance of the cleaning robot 100, and includes a manipulation button 121 to receive an operation command related to the cleaning robot 100 from a user, such as an operation command, a stop command, or a moving command, and a display panel 122 to display operation information of the cleaning robot 100 such as information regarding whether the cleaning robot 100 is in operation or in a moving mode. The manipulation button 121 as such may be implemented with a membrane switch, and the display panel 122 may be implemented with a Liquid Crystal Display (LCD) panel or a Light Emitting Diode (LED) panel.

The ceiling image obtaining unit 130 uses an upper direction camera module 131 that is provided at an upper surface of the body 101 of the cleaning robot 100 to obtain an image of a ceiling of the cleaning space, and to output an electrical signal that corresponds to the obtained image.

The floor image obtaining unit 140 uses a front direction camera module 141 provided at a front surface of the body 101 of the cleaning robot 100 to obtain a two-dimensional image of a floor to be cleaned, and output an electrical signal that corresponds to the obtained image. However, the floor image obtaining unit 140 is not limited to the front direction camera module 141, but may use an apparatus, such as an ultrasonic sensor module, a stereo camera module, or a depth sensor module, as long as the apparatus is capable of obtaining an image of a floor in front of the cleaning robot.

The ultrasonic sensor module is configured to emit ultrasonic waves and detect the ultrasonic waves reflected from a floor, and analyze the detected ultrasonic waves, thereby obtaining a schematic three-dimensional image. The cleaning robot 100 may determine a protruded portion of the floor from the three-dimensional image obtained by the ultrasonic sensor module, as dust.

In addition, the stereo camera module is provided in a way that a pair of two-dimensional cameras is provided while having a certain distance with respect to each other, and may be able to obtain a three-dimensional image on the basis of one pair of two-dimensional images obtained by the one pair of the two-dimensional cameras and the difference between the two-dimensional images. The cleaning robot 100 may determine a protruded portion of a floor from the three-dimensional image obtained by the stereo camera module, as dust.

In addition, the depth sensor module includes a two-dimensional camera to obtain a two-dimensional image of a floor, and an infrared light sensor configured to emit an infrared light and detect the infrared light reflected from a floor and extract distance information on the basis of the detected infrared light, and obtains a three-dimensional image by matching the two-dimensional image obtained by the two-dimensional camera and the distance information obtained by the infrared sensor. The cleaning robot 100 may determine a protruded portion of a floor from the three-dimensional image obtained by the depth camera module, as dust.

On FIG. 2, the floor image obtaining unit 140 includes one front direction camera module 141 as to obtain an image of a floor in front of the body 101, but is not limited hereto. That is, the floor image obtaining unit 140, not only the front direction camera module 141 configured to obtain an image of a floor in front of, may further include a left side camera module and a right side camera module as to obtain a left side and a right side images of the body 101, respectively.

In addition, as illustrated on FIG. 2, in order for the front direction camera module 141 to have an adequate viewing angle, the front direction camera module 141 is preferred to be positioned at an upper portion of a front surface of the body 101, but is not limited hereto, and the front direction camera module 141 may be installed at any position as long as an image of a floor in front of the body 101 is obtained.

The obstacle detecting unit 150 includes an infrared light sensor module 151 each provided at a side surface of a front surface, a left surface, and a right surface of the body 101 of the cleaning robot 100 configured to radiate an infrared light toward a front direction, a left direction, and a right direction, respectively, and also configured to detect the infrared light reflected from the obstacle. However, the obstacle detecting unit 150 is not limited to the infrared light sensor module 151, but may include the ultrasonic wave sensor module configured to emit an ultrasonic wave toward front, left, and right directions of the body 101 of the cleaning robot 100 and also configured to detect the ultrasonic wave reflected from the obstacle.

The moving unit 160 includes a pair of moving wheels 161 and 162 installed at the left side and right side edges of a lower surface of the body 101 of the cleaning robot 100 to enable the cleaning robot 100 to move forward, backward, and to rotate, a pair of driving motors 163 and 164 configured to respectively rotate the pair of moving wheels 161 and 162, and a roller 165 installed at a front of a lower surface of the body 101 of the cleaning robot 100 to rotate according to a moving direction of the cleaning robot 100 while supporting a moving of the cleaning robot 100.

The cleaning unit 170 includes a main brush 172 installed at a dust suction port 103 formed at a lower surface of the body 101 of the cleaning robot 100 to sweep and scatter dust on a floor to be cleaned while rotating, a brush motor 173 installed adjacent to the main brush 172 to rotate the main brush 172, a pair of sub brushes 174a and 174b installed at left side and right side edges of a front of a lower surface of the body 101 of the cleaning robot 100 to guide dust of a floor to be cleaned to the main brush 172, and a dust container 175 configured to take in and store the dust scattered by the main brush 172.

The main brush 172 is configured to rotate as to scatter the dust on a floor to be cleaned toward the dust container 175 while having a rotating axis, which is parallel to the floor to be cleaned, as a center, and the pair of sub brushes 174a and 174b is configured rotate as to move the dust, which is at an area at which the main brush 172 is not able to perform a cleaning, toward the main bush 174 while having a rotating axis, which is perpendicular to the floor to be cleaned, as a center. In addition, the pair of sub brushes 174a and 174b, not only being able to rotate at its initial position, may be protrudedly installed toward an outside of the body 101 of the cleaning robot 100 as to be able to expand an space to be cleaned that the cleaning robot 100 is configured to perform a cleaning.

The storage unit 180 may include a non-volatile memory (not shown) such as a magnetic disc and a solid state disk to permanently store a control program and control data to control an operation of the cleaning robot 100, as well as a volatile memory (not shown) such as a D-RAM or a S-RAM configured to temporarily store temporary data generated during a process of controlling an operation of the cleaning robot 100.

The communication unit 190 may include a wireless communication module (not shown) configured to perform a wireless communication with an outside apparatus (not shown) or a recharging station (not shown) by using a wireless communication method such as Wireless Fidelity (Wi-Fi), Bluetooth, Zigbee, near field communication (NFC), or Wireless Broadband Internet (Wibro).

The control unit 110 is configured to control an operation of the moving unit 160 and the cleaning unit 170 based on an operation command of a user through the user interface unit 120, as well as an output of the ceiling image obtaining unit 130, the floor image obtaining unit 140, and the obstacle detecting unit 150. For example, when a cleaning command is input through the user interface unit 120, the control unit 110 controls the moving unit 160 so that the cleaning robot 100 is able to move along a predetermined moving track, and also controls the cleaning unit 170 so that the dust on the moving track at which the cleaning robot 100 moves may be cleaned.

The control unit 110 as such may include a control processor configured to perform an operation on a control program stored at the storage unit 180 and data that is being input according to the control program and to output a result of the operation. In addition, the control unit 110 may include an Application Processor (AP) configured to perform all operations, or may include a plurality of processors, such as a Graphic Processing Unit (GPU), a Communication Processor (CP), or a Central Processing Unit (CPU), configured to perform specialized functions.

The detailed structure of the control unit 110 will be described hereinafter.

Although not illustrated on the drawings, the cleaning robot 100 may include a lighting unit (not shown) configured to illuminate a floor to be cleaned. In detail, in an embodiment in which the cleaning robot 100 performs a cleaning on a dim area, the floor image obtaining unit 140 may not be able to obtain a proper floor image to be cleaned. In the case as the above, the lighting unit (not shown) illuminates the floor to be cleaned according to a control signal of the control unit 140.

Figure 4:
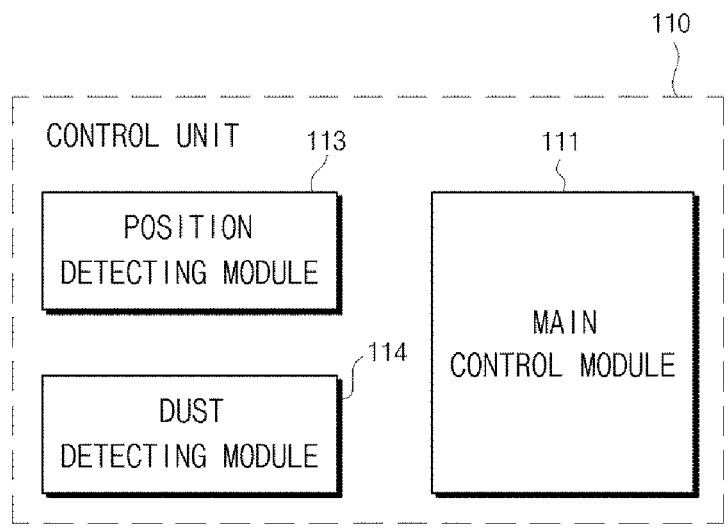
FIG. 4 is a block diagram illustrating a configuration of a control unit included in the cleaning robot in accordance with an embodiment.

FIG. 4 is a block diagram illustrating a configuration of the control unit included in the cleaning robot in accordance with an embodiment.

By referring to FIG. 4, the control unit 110 includes a position detecting module 113 configured to detect a position of the cleaning robot 100 on the basis of the image of a ceiling obtained by the ceiling image obtaining unit 130, a dust detecting module 114 configured to detect a position of the dust positioned on a floor to be cleaned on the basis of the floor image obtained by the floor image obtaining unit 140, and a main controlling module 111 configured to generate a control signal configured to control the moving unit 160 and the cleaning unit 170 on the basis of the position of the cleaning robot 100 and the position of the dust.

The position detecting module 113 is configured to detect the relative position of the cleaning robot 100 in a space to be cleaned, by using the image of the ceiling of the space to be cleaned that is obtained by the upper direction camera module 131.

The dust detecting module 114 is configured to detect whether dust is present on a floor to be cleaned as well as the relative position of the dust with respect to the cleaning robot 100, by analyzing the floor image to be cleaned that is obtained by the floor image obtaining unit 140.

The operations of the dust detecting module 114 will be hereinafter described in detail.

The main control module 111 is configured to generate a control signal configured to control the moving unit 160 so that the cleaning robot 100 may be able to move at a space to be cleaned on the basis of the position of the cleaning robot 100 and the position of the dust that are output from the position detecting module 113 and the dust detecting module 114, respectively, and also configured to generate a control signal configured to control the cleaning unit 170 according to an operation mode of the cleaning robot 100.

The descriptions with respect to the detecting of dust by the dust detecting module 114 will be described hereinafter.

Figure 5:
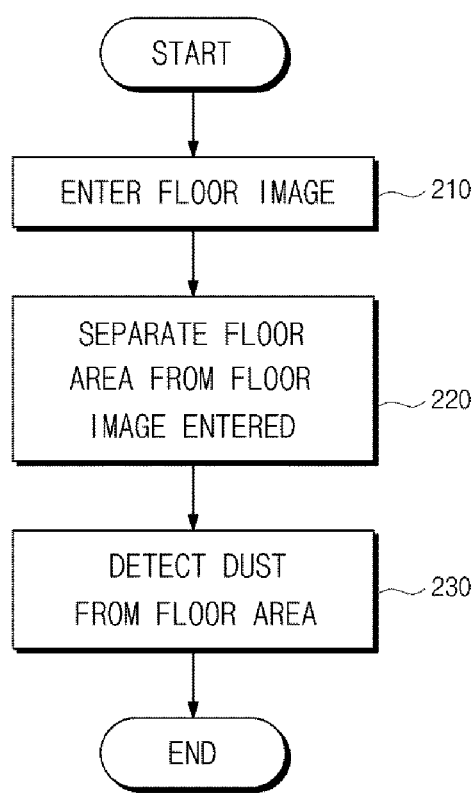
FIG. 5 is a flow chart illustrating a method of detecting dust by a dust detecting module included in the cleaning robot in accordance with an embodiment.

FIG. 5 is a flow chart illustrating a method of detecting dust by the dust detecting module included in the cleaning robot in accordance with an embodiment.

By referring to FIG. 5, an image of a floor to be cleaned is input into the dust detecting module 114 (210). In detail, the floor image obtaining unit 140 obtains an image of a floor to be cleaned, and inputs the obtained image into the dust detecting module 114 that is included in the control unit 110.

When the floor image is input, the dust detecting module 114 separates a floor area from the floor image by dividing the input floor image into a floor area and an area that is not a floor (220). The separating of the floor by the dust detecting module 114 may be performed by using a watershed algorithm that uses a marker. The dividing of the floor area and the area that is not the floor by the dust detecting module 114 will be described below in detail.

When the floor image is divided into the floor area and the area that is not the floor, the dust detecting module 114 detects dust from the floor area of the floor image (230). The detecting of dust from the floor area of the floor image by the dust detecting unit 114 may be performed by using an edge extracting algorithm. The detecting of dust from the floor area of the floor image by the dust detecting unit 114 will be described below in detail.

First, the extracting of the floor area from the floor image by the dust detecting unit 114 will be described.

Figure 6A:
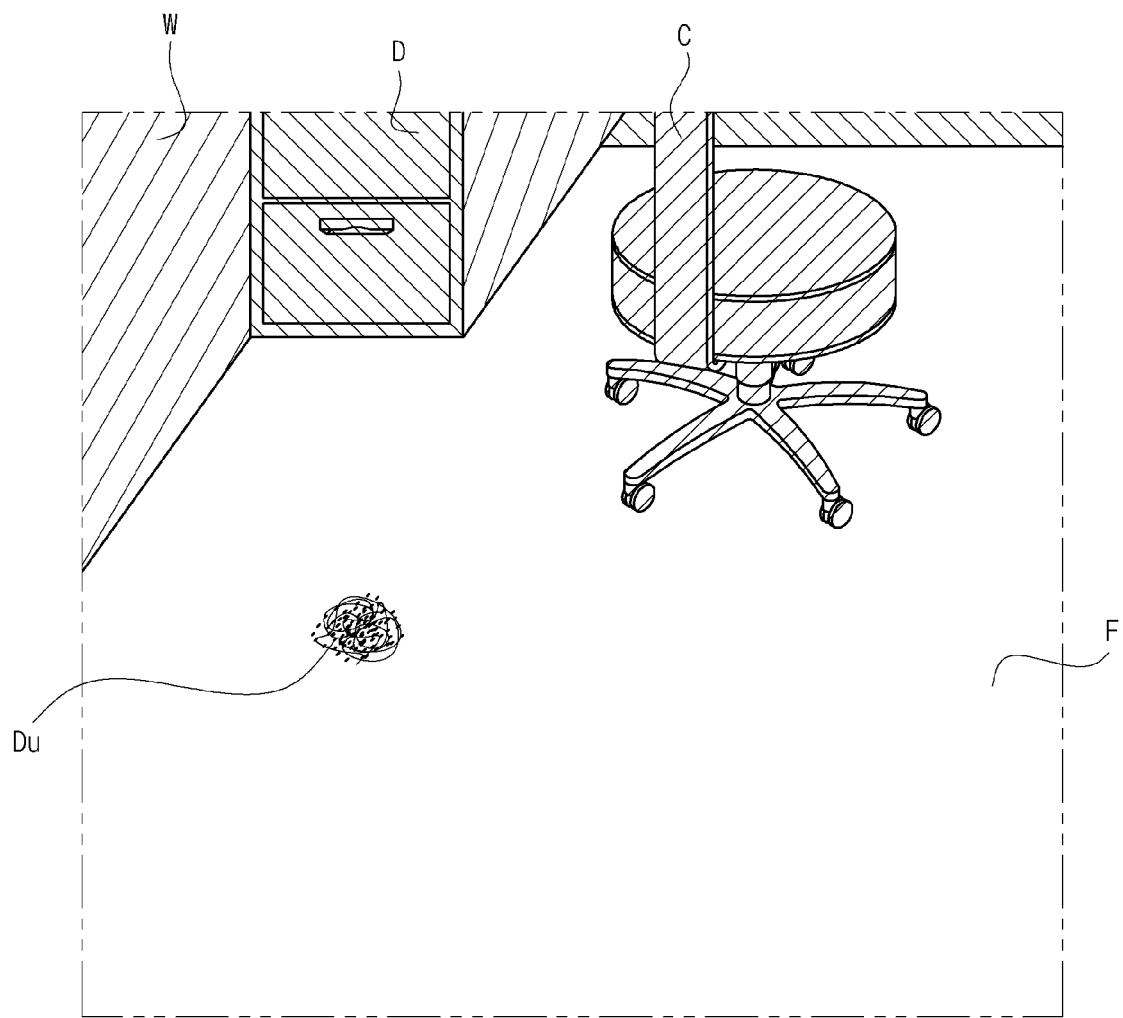
FIG. 6A is a drawing illustrating one example of an image of a floor that is input into the dust detecting module included in the cleaning robot in accordance an embodiment.
Figure 6B:
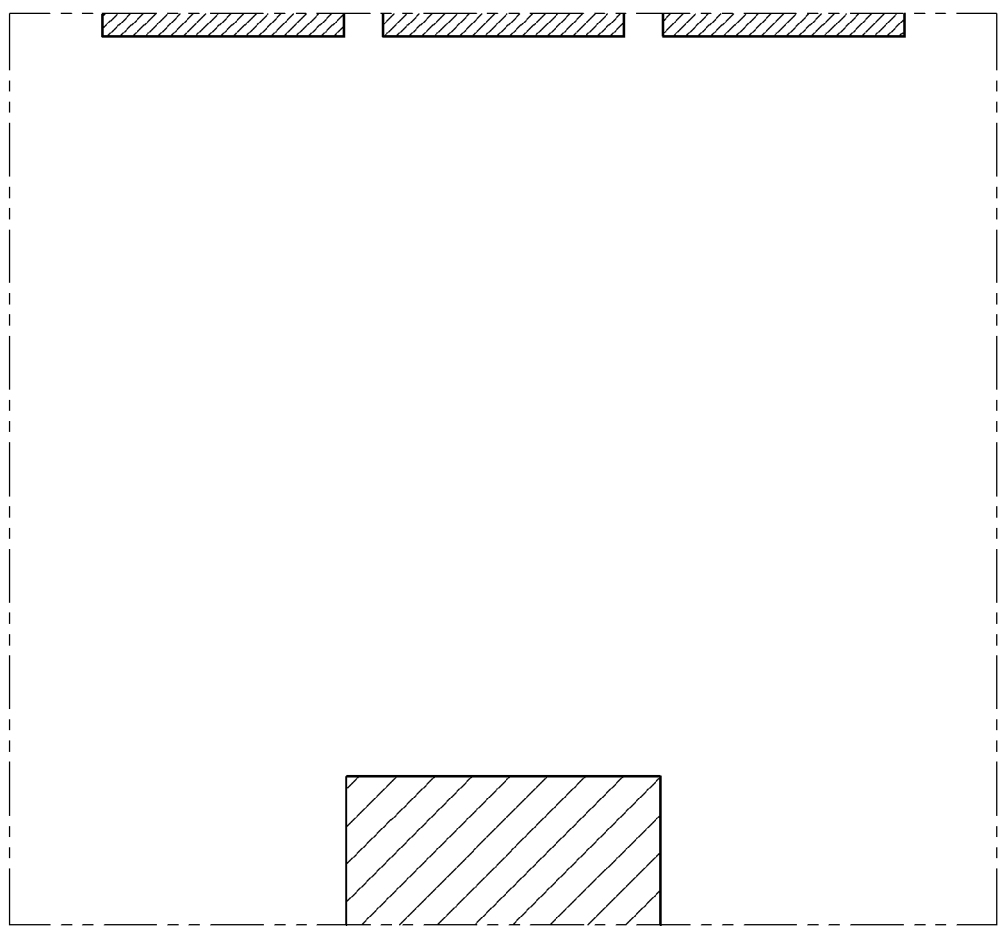
FIG. 6B is a drawing illustrating one example of a marker configured to extract a floor area from the floor image that is input into the dust detecting module included in the cleaning robot in accordance with an embodiment.
Figure 6C:
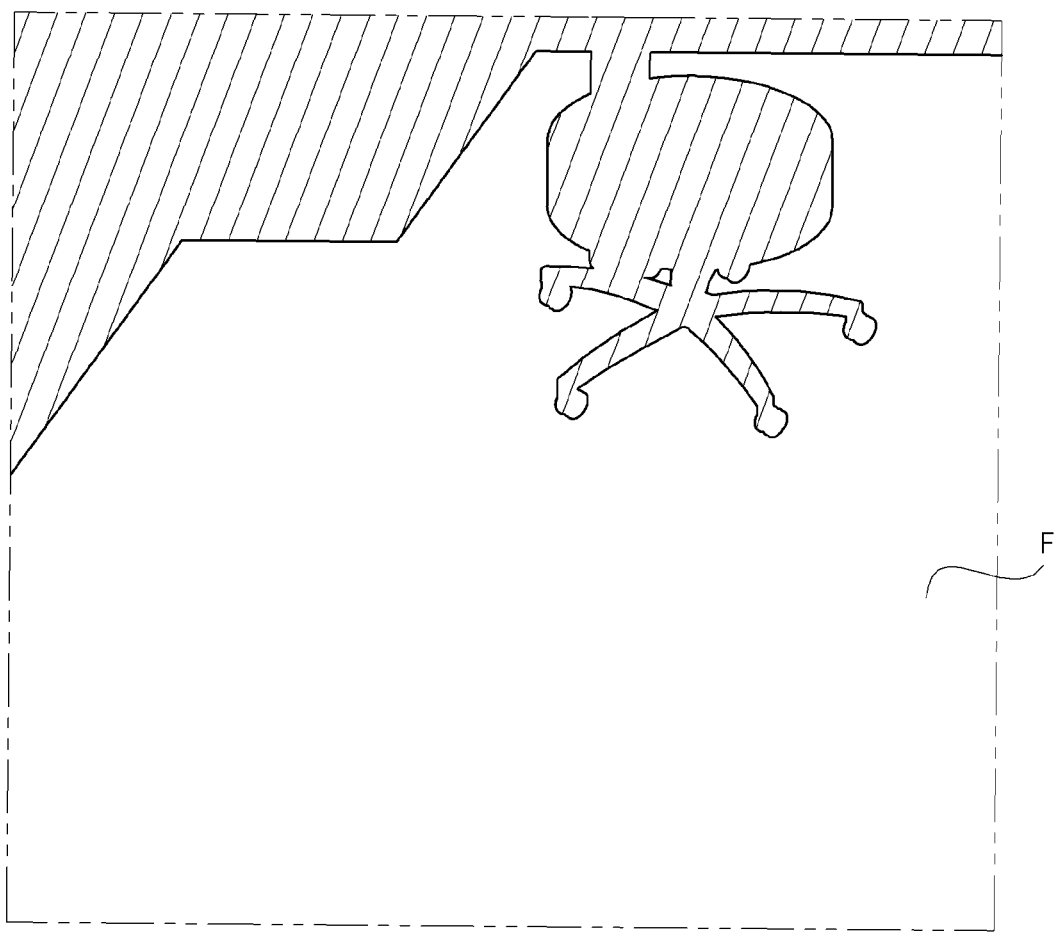
FIG. 6C is a drawing illustrating a floor area that is separated by the marker illustrated on FIG. 6C from the floor image illustrated on FIG. 6A.

FIG. 6A is a drawing illustrating one example of an image of a floor that is being input into the dust detecting module included in the cleaning robot in accordance with an embodiment, FIG. 6B is a drawing illustrating one example of a marker configured to extract a floor area from the floor image that is being input into the dust detecting module included in the cleaning robot in accordance with an embodiment, and FIG. 6C is a drawing illustrating a floor area that is separated by the marker illustrated on FIG. 6C from the floor image illustrated on FIG. 6A.

One example of the floor image illustrated on FIG. 6A represents an image that is obtained by the floor image obtaining unit 140 of the cleaning robot 100 and provided to the dust detecting module 114, and includes a floor area 'F', dust on a floor 'Du', a wall area of a space to be cleaned 'W', a desk area 'D' and a chair area 'C' located in the space to be cleaned.

As for the dust detecting module 114 to precisely detect the dust 'Du' positioned on a floor, the floor image is needed to be divided into the floor area 'F' and the area that is not the floor. Among various algorithms of dividing an image into a plurality of areas, a watershed algorithm is one of the most representative algorithms.

The watershed algorithm is an algorithm, when considering an image as a two-dimensional topography having a pixel value as a height, configured to divide an image by determining a puddle surrounded by a single contour line as a divided area when the two-dimensional topography is filled with water. Depending on the method of implementation, the method may be divided into a flooding method and a rainfalling method.

According to the flooding method, when assuming that a hole is present at a local minimum of the two-dimensional topography, water is gradually filled from the lowest place. As the water is gradually filled and the height of the water is reached at a certain level, the two waters being filled at opposite sides while having a peak thereinbetween are combined. At this time, dams are built so that the combining of the two waters is prevented. By use of the method as the above, the water is filled up to a final height and as a result of the above, the connecting lines of the dams being generated become a watershed, and the watershed serves as a boundary that divides the image.

Compared to the above, the rainfalling method is not configured in a way to fill water from the lowest place, but is configured in a way to spray water from the top and then to scan the pixels of an image to find the minimum point, and by merging the pixels having the same minimum points to form an area, and according to the area that is formed, the image is divided.

In an embodiment in which the watershed algorithm as discussed above is applied to one embodiment of the image of a floor illustrated on FIG. 6A, the image may be excessively divided. That is, the floor image may be needlessly divided into many areas. For example, from the one embodiment of the floor image illustrated on FIG. 6A, at the portion on the floor image at which the desk and the wall meet, the desk area 'D' and the wall area 'W' may be divided into separate areas. In addition, with respect to the portion at which the desk and the chair overlap to each other as well, the desk area 'D' and the chair area 'C' may be divided into separate areas.

In order to prevent the undesired division of the area, the dust detecting module 114 may use a marker as illustrated on FIG. 6B. The areas sharing the same marker may become a single area without being divided.

As illustrated on FIG. 6A, the floor image obtained by the floor image obtaining unit 140 is generally provided with a floor positioned at a central position of the floor image, and at an upper portion of the floor image, the objects other than the floor such as a wall, a desk, and a chair are positioned, since the front direction two-dimensional camera 141 included in the floor image obtaining unit 140 is slightly facing toward a lower direction from a front side to obtain a floor image. Due to the above, at the center of the floor image obtained by the floor image obtaining unit 140, a floor is positioned, and at an upper portion or at the edges of the image, various furniture or walls that are positioned in the space to be cleaned are positioned. In addition, since the front direction two-dimensional camera 141 is slightly facing toward a lower direction from the front side, an image of a very front portion of the cleaning robot 100 may be included in a central portion of a lower portion of the floor image.

Accordingly, as shown in FIG. 6B, the portions other than the floor are combined into a single area by putting markers on the upper portion of the floor image and the lower portion of the floor image.

As the example of the floor image illustrated on FIG. 6A is divided through the watershed algorithm that uses a marker illustrated on FIG. 6B, the floor image may be divided into the floor area 'F' and the area that is not the floor area as illustrated on FIG. 6C.

The dust detecting module 114 is provided to use the watershed algorithm that uses a marker to separate the floor area from the area that is not the floor from the floor image, but the present disclosure is not limited hereto. For example, the floor area may be extracted by using only a central portion of the floor image by removing a lower portion and an upper portion of the floor image.

As the above, as the floor area is separated from the floor image, the dust detecting module 114 detects dust from the floor area of the floor image.

The dust detecting unit 114 may use the edge extracting algorithm as to detect dust from the floor area of the floor image.

The dust detecting unit 114 may be able to perform a pre-processing on an image prior to the edge detection. For example, in an embodiment in which the floor image is a color image, the dust detecting unit 114 first of all converts the color image into a black/white image as to detect an edge. The converting of the color image into the black/white image is achieved by assigning a certain weighted value to each of color elements of the pixels of the color image, such as red 'R', green 'G', and blue 'B' elements and performing summation, as shown on the [Mathematical Formula 1].

$$I_{gray} = w_R \times I_R + w_G \times I_G + w_B \times I_B.$$ [Mathematical Formula 1]

(Here, $I_{gray}$ is referred to as a contrast of each pixel included in the black/white image, $w_R$ is referred to as a weighted value for the red 'R', $I_R$ is referred to as an intensity of the red 'R' of each pixel included in the color image, $w_G$ is referred to as a weighted value for the green 'G', $I_G$ is referred to as an intensity of the green 'G' of each pixel included in the color image, $w_B$ is referred to as a weighted value for the blue 'B', and $I_B$ is referred to as an intensity of the blue 'B' of each pixel included in the color image)

At this time, the weighted values with respect to the red 'R', the green 'G', and the blue 'B' may be set at about 50%, 20%, and 30%, respectively. After proceeding with the pre-processing, the dust detecting module 114 performs an edge detection on the floor image. Examples of the edge detection may include the Sobel edge detecting algorithm, the Prewitt edge detecting algorithm, the Robert edge detecting algorithm, the Laplacian edge detecting algorithm, and the Canny edge detecting algorithm, and may use any one algorithm from the above.

Figure 7A:
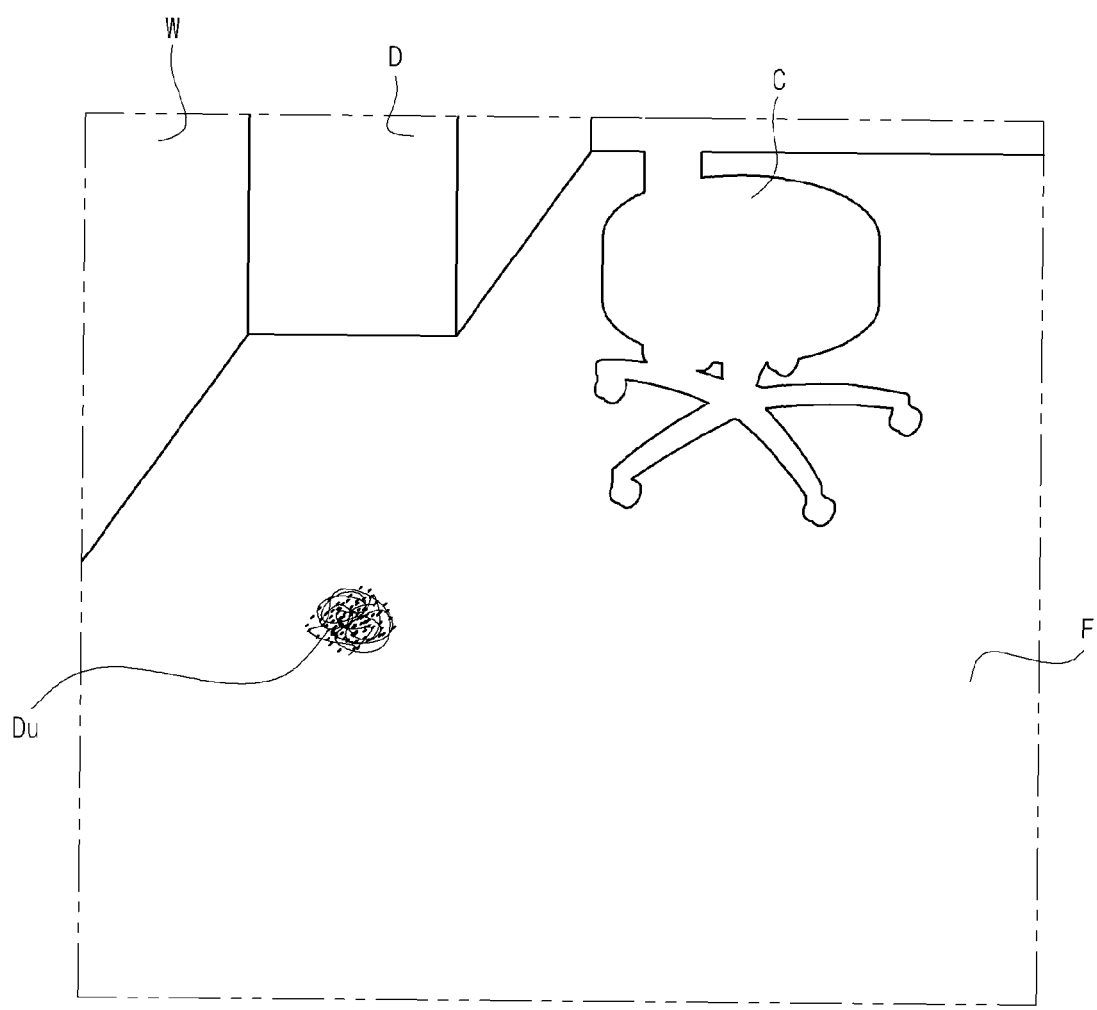
FIG. 7A is a drawing showing an extraction of an edge that is performed with respect to the floor image illustrated on FIG. 6A.
Figure 7B:
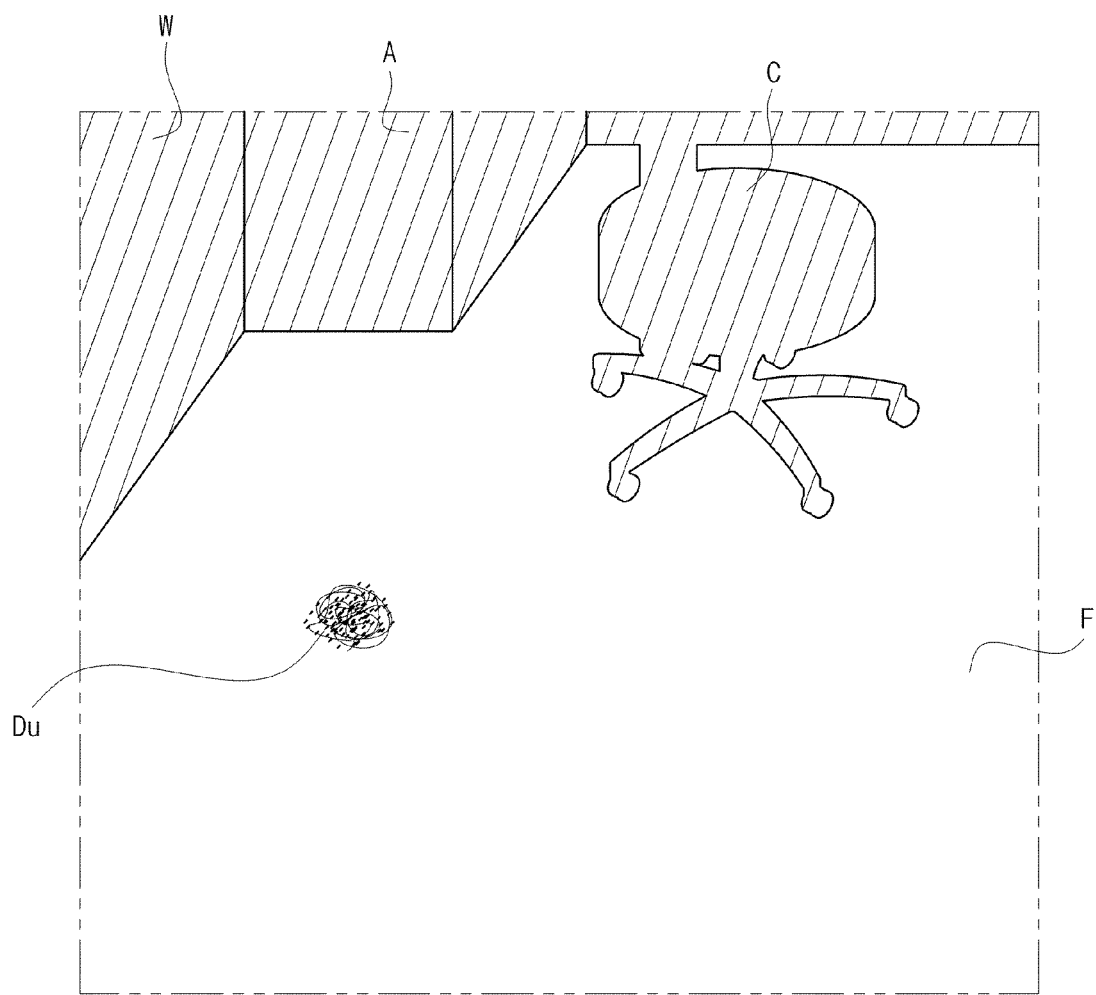
FIG. 7B is a drawing showing an overlap image of a floor area of FIG. 6C and the edge of FIG. 7A.
Figure 7C:
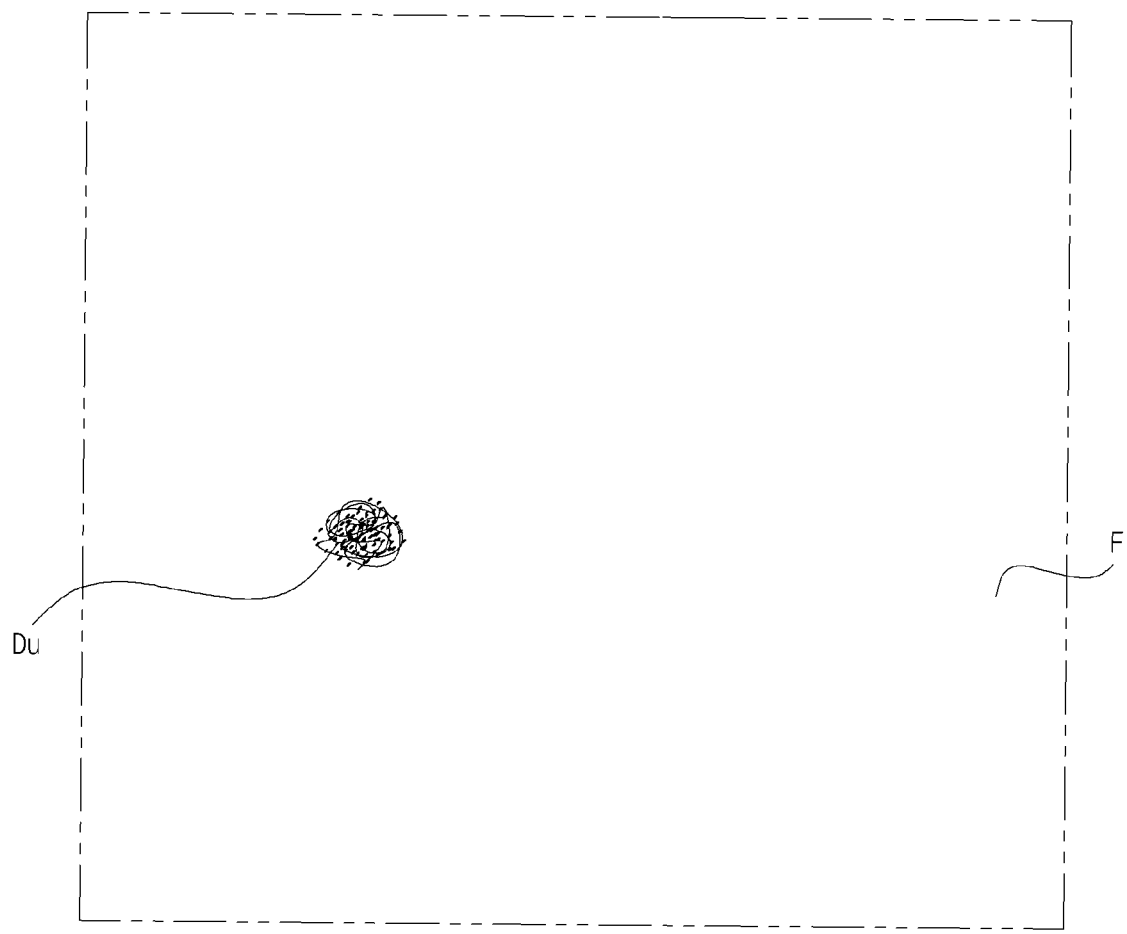
FIG. 7C is a drawing illustrating dust detected by using the floor area of FIG. 6C and the edge of FIG. 7A.

FIG. 7A is a drawing showing an edge extraction that is performed on the floor image illustrated on FIG. 6A, FIG. 7B is a drawing showing an overlap image of a floor area of FIG. 6C and the edge of FIG. 7A, and FIG. 7C is a drawing illustrating dust detected by using the floor area illustrated on FIG. 6C and the edge illustrated on FIG. 7A.

When the dust detecting unit 114 performs an edge extraction on the floor image illustrated on FIG. 6A, the edge of the floor image may be extracted as illustrated on FIG. 7A. The extracted edge of the floor image as illustrated on FIG. 7A include not only the edge of the dust 'Du' within the floor area 'F' but also the edge of the area other than the floor.

As to extract only the edge in the floor 'F' from the edge of the floor image, the dust detecting module 114 performs a logical product on the edge of FIG. 7A and the floor area 'F' of FIG. 6C, as illustrated on FIG. 7B. That is, only the edge positioned at the floor are 'F' is extracted from the edges illustrated on FIG. 7A.

When the dust detecting unit 114 performs the logical product on the edge of FIG. 7A and the floor area 'F' of FIG. 6C, the edge of the dust 'Du' that is on the same floor is extracted as illustrated on FIG. 7C.

The dust detecting module 114 detects whether dust is present, which is on a floor to be cleaned, through the extracted edge of the floor area 'F' and if the dust is present, the position of the dust is calculated, and the position is provided to the main control module 111.

Although described later, in an embodiment in which the dust detecting unit 114 provides the position of the dust present on the floor to be cleaned, the main control module 111 controls the moving unit 160 so that the cleaning robot 100 may be moved to the position of the dust.

Figure 8A:
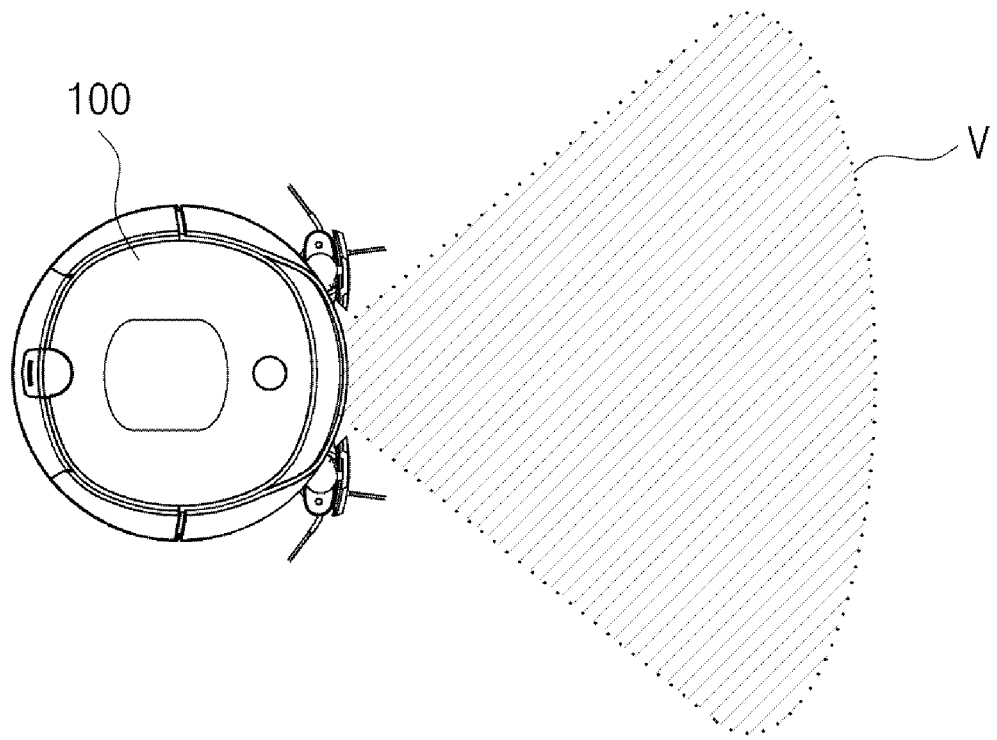
FIG. 8A and FIG. 8B are drawings illustrating one example of a vision of the cleaning robot in accordance with an embodiment.
Figure 8B:
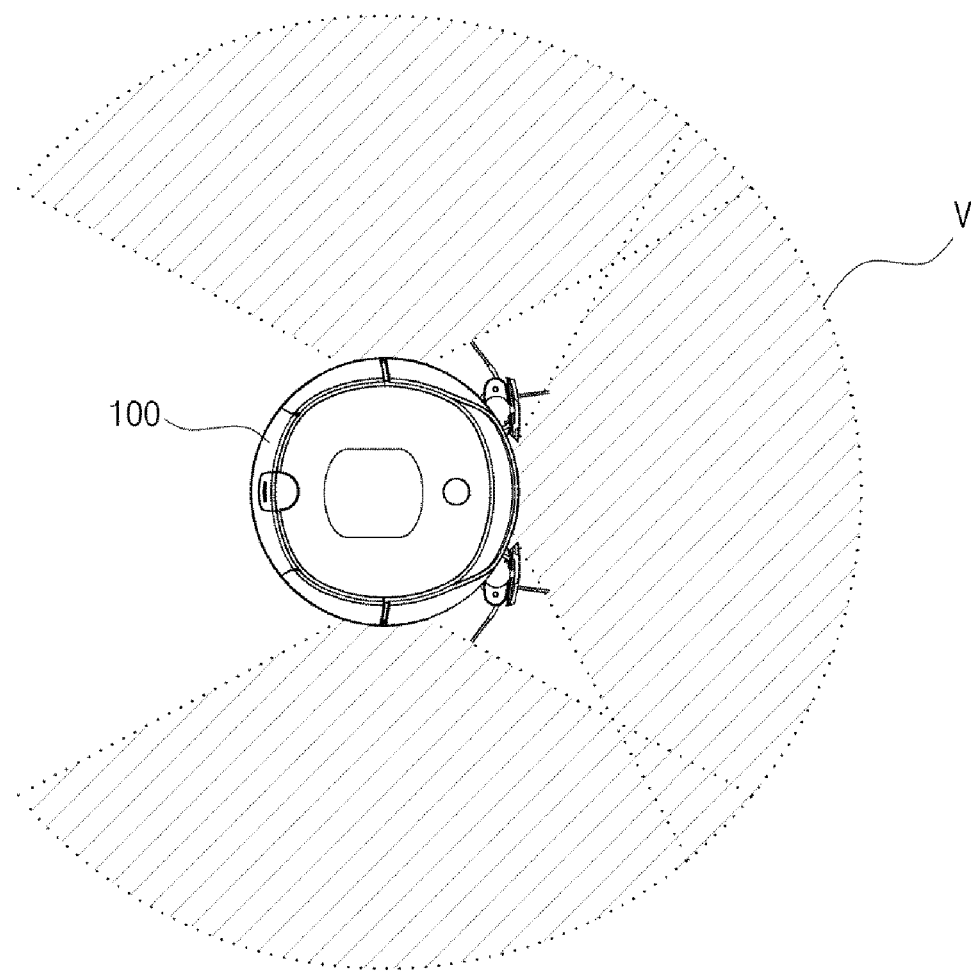

FIG. 8A and FIG. 8B are drawings illustrating one example of a vision of the cleaning robot in accordance with an embodiment. In detail, FIG. 8A is a drawing illustrating a vision of the cleaning robot 100 in an embodiment in which the floor image obtaining unit 140 includes only the front direction camera module provided at a front of the body 101 (FIG. 2) of the cleaning robot 100, FIG. 8B is a drawing illustrating a vision of the cleaning robot 100 in an embodiment in which the floor image obtaining unit 140 includes the left side camera module and the right side camera module provided at the left side and right side surfaces of the body 101 (FIG. 2) of the cleaning robot 100 as well as the front direction camera module.

In an embodiment in which the floor image obtaining unit 140 includes only the front direction camera module provided at a front of the body 101 (FIG. 2) of the cleaning robot 100, as illustrated in FIG. 8A, the cleaning robot 100 is provided with a vision having the shape of a fan that is open toward a front of the body 101 (FIG. 2) of the cleaning robot 100. The vision of the cleaning robot 100 as such may vary depending on the position of the front direction camera module.

In addition, in an embodiment in which the floor image obtaining unit 140 includes the left side camera module and the right side camera module provided at the left side and right side surfaces of the body 101 (FIG. 2) of the cleaning robot 100 as well as the front direction camera module, as illustrated in FIG. 8B, the cleaning robot 100 is provided with a vision having the shape of a fan that is open toward a front of the body 101 (FIG. 2) of the cleaning robot 100, a vision having the shape of a fan that is open toward a right side of the body 101 (FIG. 2) of the cleaning robot 100, and a vision having the shape of a fan that is open toward a left side of the body 101 (FIG. 2) of the cleaning robot 100.

Hereinafter, for the convenience of the descriptions to be provided, the floor image obtaining unit 140 is assumed to be provided with only the front direction camera module, but the clarification is also provided that the floor image obtaining unit 140 may further include the left side camera module and the right side camera module.

Figure 9:
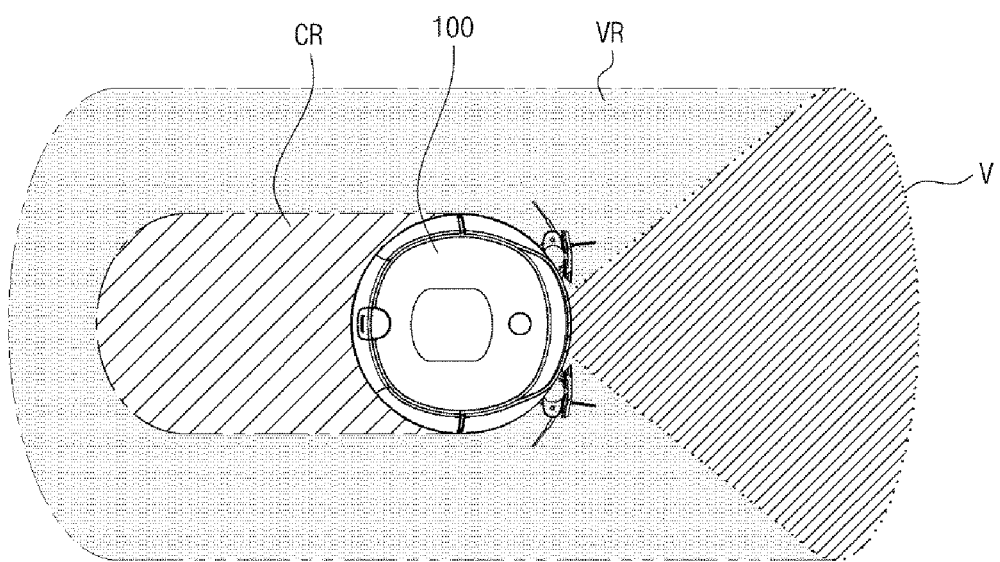
FIG. 9 is a drawing illustrating an area of a vision of the cleaning robot and a cleaning area to be cleaned in which the cleaning robot performs cleaning while moving in accordance with an embodiment.

FIG. 9 is a drawing illustrating a vision area of the cleaning robot and a space to be cleaned at which the cleaning robot moves to perform a cleaning in accordance with an embodiment.

Referring to FIG. 9, the width of a space to be cleaned 'CR' at which the cleaning robot 100 moves and performs a cleaning is similar to the width of the cleaning robot 100. The width of the main brush 172 (FIG. 2) of the cleaning robot 100 is narrower than the width of the body 101 of the cleaning robot 100, but since the pair of sub brushes 174*a* and 174*b* (FIG. 2) guides dust toward the main brush 172, the cleaning robot 100 may be able to perform a cleaning on the area having a similar width as the width of the body 101 (FIG. 2) of the cleaning robot 100. When compared to the above, the width of a vision 'V' of the cleaning robot 100 capable of detecting dust by use of the floor image obtaining unit 140 is wider than the width of the cleaning robot 100. Although a difference may be present depending on the front direction camera module 141 (FIG. 2) that is being used at the floor image obtaining unit 140, a dust scouting area 'VR' at which a scouting is performed by the floor image obtaining unit 140 is wider than the space to be cleaned 'CR' at which a cleaning is performed by the cleaning robot 100. In other words, the cleaning robot 100 may be able to detect dust at the dust scouting area 'VR' that is wider than the space to be cleaned 'CR' at which the cleaning robot 100 performs a cleaning.

Hereinbefore, each part and each operation of the parts of the cleaning robot 100 in accordance with an embodiment are described.

Hereinafter, the operation of the cleaning robot 100 will be described.

The cleaning robot 100 may be moved at a cleaning mode and a scouting mode.

In a general cleaning mode, the cleaning robot 100 is configured to move along a cleaning track (hereinafter the cleaning track will be defined as a track at which the cleaning robot 100 moves in the general cleaning mode), and removes dust on the cleaning track. Since the vision of the cleaning robot 100 is wider than the space to be cleaned by the cleaning robot 100, the cleaning robot 100 may be able to detect the dust that is not positioned on the cleaning track, and thus the cleaning robot 100 detects dust on the floor of the space to be cleaned while moving along the cleaning track. When dust is detected, the cleaning robot 100 moves to the position at which the dust is detected, and may perform a cleaning first on the position at which the dust is positioned. In addition, when dust is detected, if the dust detected is distant from the cleaning robot 100, the cleaning robot 100 moves along the cleaning track until the distance between the cleaning robot 100 and the dust is less than a certain distance. Then, when the distance between the cleaning robot 100 and the dust is less than a certain distance, the cleaning robot 100 moves to the detected position at which the dust is detected and performs a cleaning on the position at which the dust is positioned.

At this time, in the general cleaning mode, the cleaning robot 100 may be able to move along a predetermined track, such as a zigzag track, or may move along a random track that the cleaning robot 100 generated in a random manner.

In the scouting mode, the cleaning robot 100 is configured to move along a scouting track (hereinafter the scouting track will be defined as a track at which the cleaning robot 100 moves in the scouting mode), and scouts for dust on the scouting track. When dust is detected, the cleaning robot 100 moves to the position at which the dust is detected, and may perform a cleaning first on the position at which the dust is positioned. While the cleaning robot 100 is moving along the scouting track, the cleaning robot 100 may/may not perform a cleaning with respect to the floor to be cleaned.

First, the operation of the cleaning robot 100 in the general cleaning mode will be described.

Figure 10:
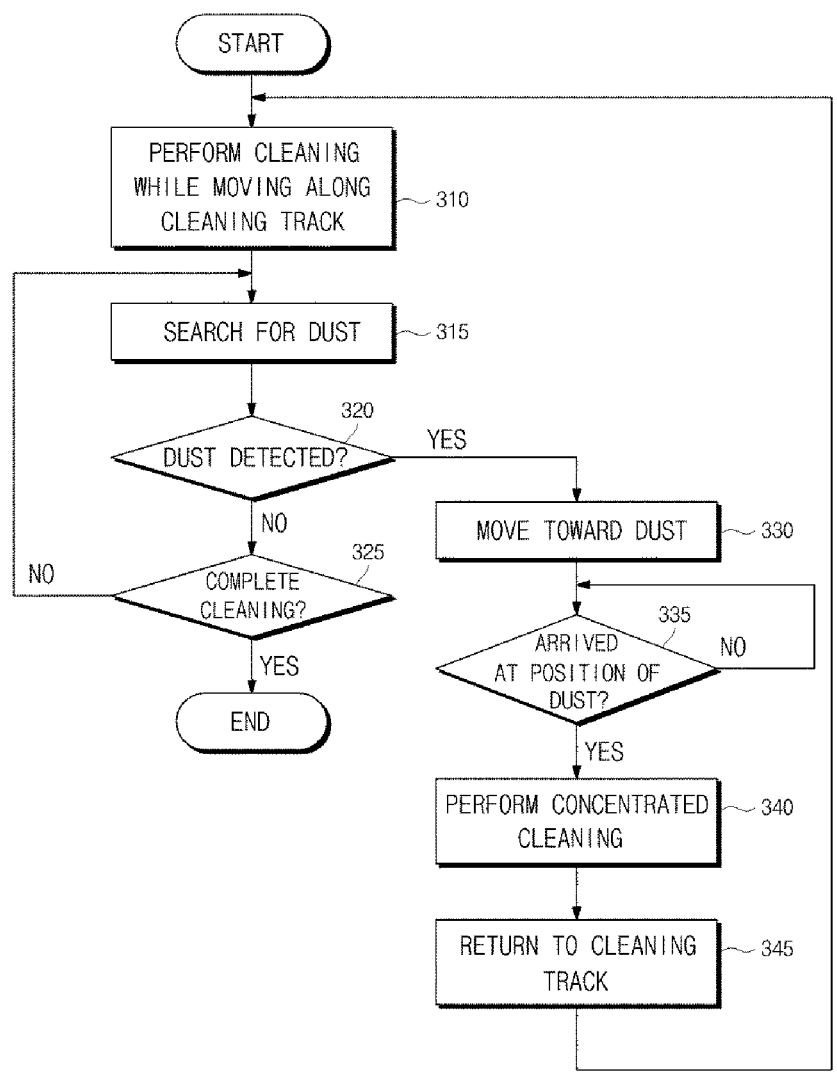
FIG. 10 is a flow chart illustrating a method of the cleaning robot performing a cleaning on a floor to be cleaned while moving along a cleaning track in accordance with an embodiment.
Figure 11A:
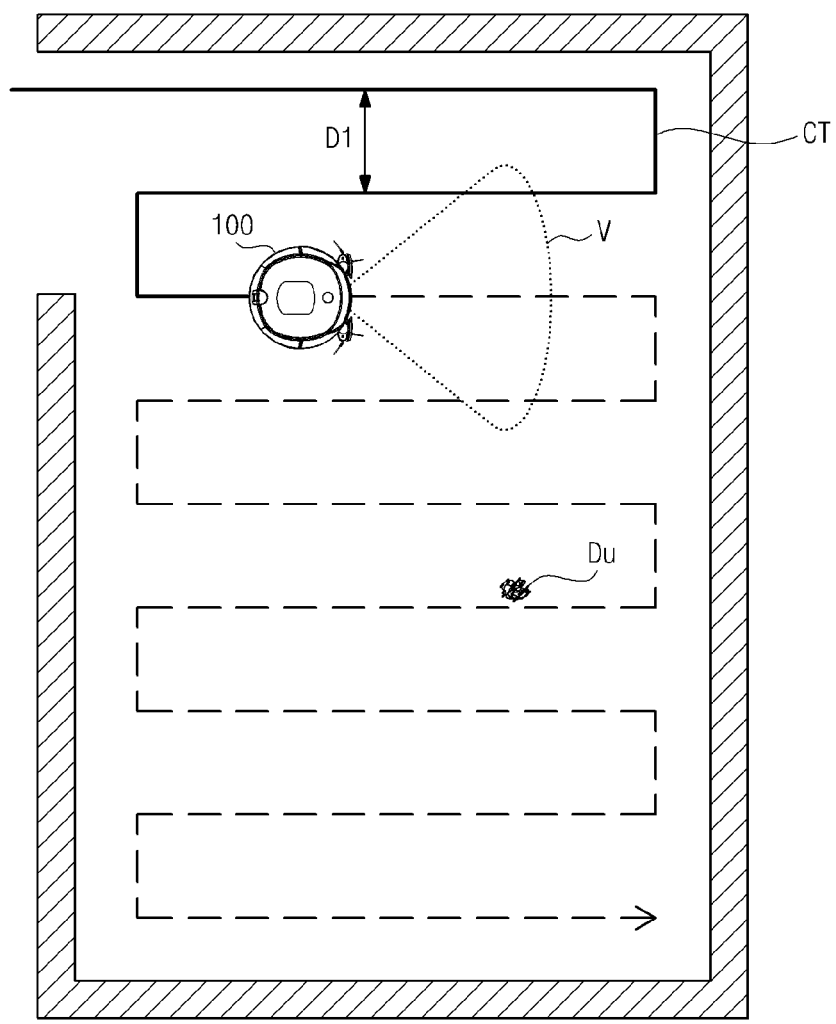
FIGS. 11A to 11D are drawings illustrating one example of the cleaning robot performing a cleaning on a floor to be cleaned while moving along a cleaning track in accordance with an embodiment.
Figure 11B:
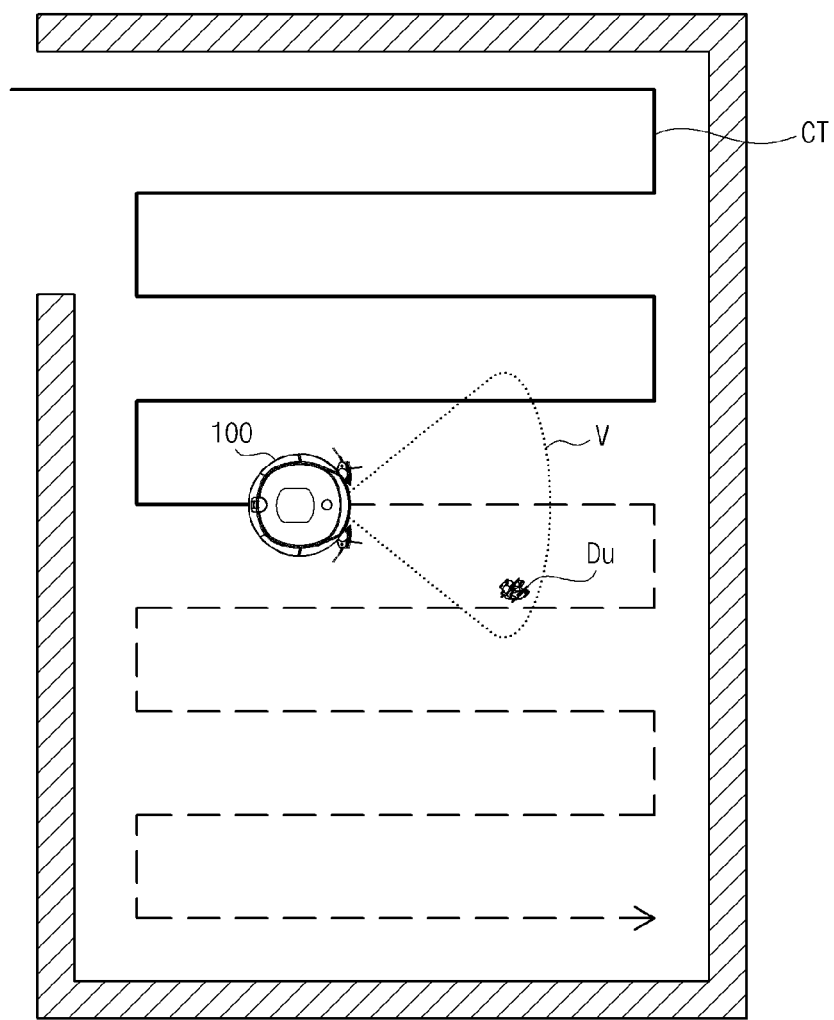
Figure 11C:
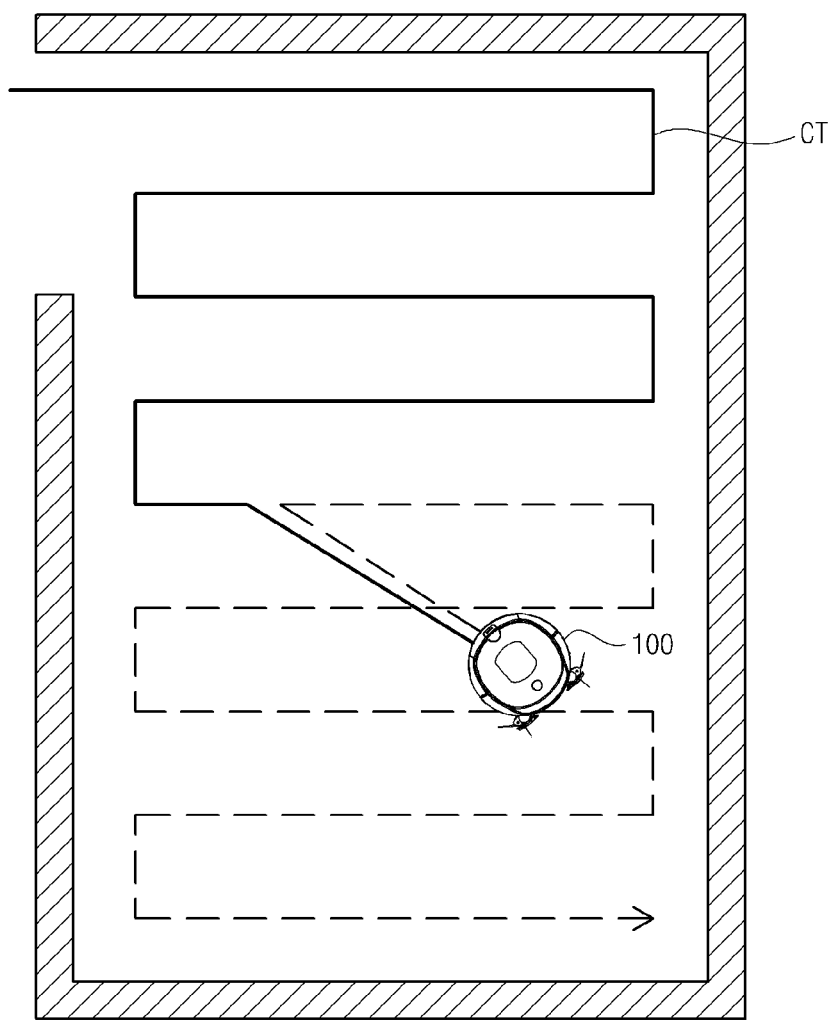
Figure 11D:
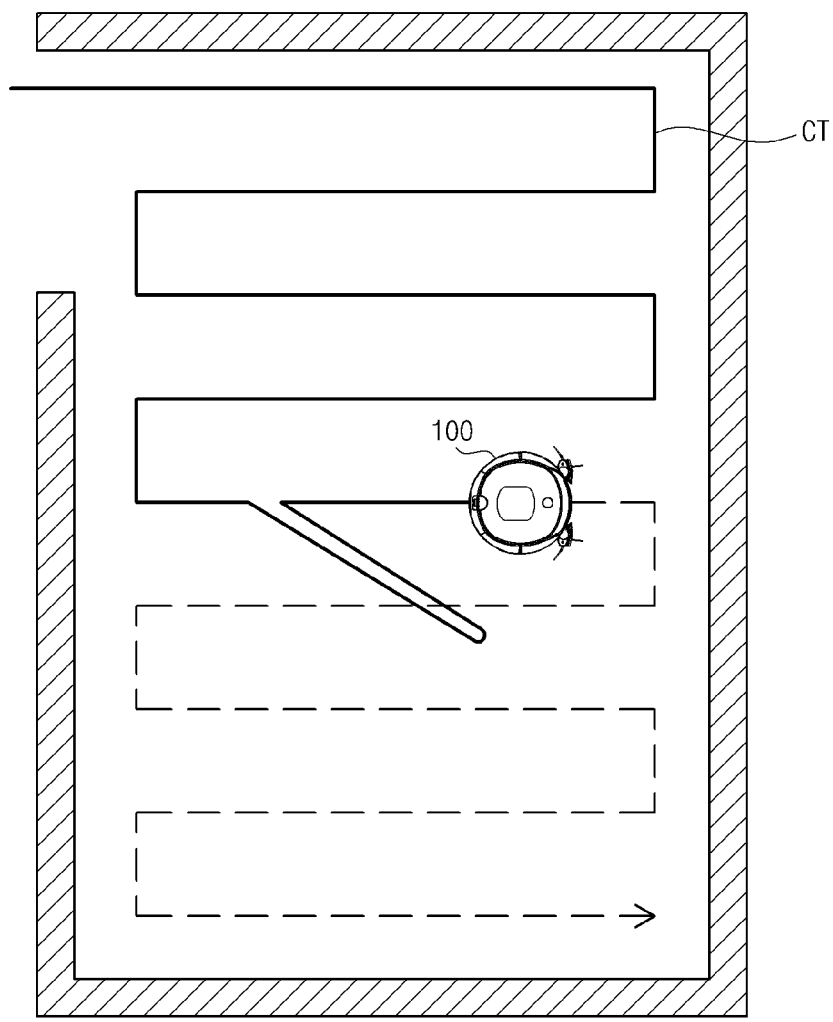

FIG. 10 is a flow chart illustrating a method of the cleaning robot performing a cleaning on a floor to be cleaned while moving along a cleaning track in accordance with an embodiment, and FIGS. 11A to 11D are drawings illustrating one example of the cleaning robot performing a cleaning on a floor to be cleaned while moving along a cleaning track in accordance with an embodiment. In detail, FIGS. 11A to 11D are drawings illustrating a cleaning of a floor to be cleaned as the cleaning robot 100 moves along the cleaning track 'CT' formed in a zigzag manner.

By referring to FIG. 10, and FIGS. 11A to 11D, the cleaning robot 100 performs a cleaning while moving along the predetermined cleaning track (310). As illustrated on FIG. 11A, for example, the cleaning robot 100 that is entered into an space to be cleaned performs a cleaning while moving along the cleaning track 'CT' that is formed in a zigzag manner. The cleaning track 'CT' that is formed in a zigzag manner is referred to as a track formed in a way for the cleaning robot 100 to move toward a certain one of the walls 'W' in the space to be cleaned, and when the cleaning robot 100 is near the wall 'W' of the space to be cleaned, the cleaning robot 100 moves along the wall 'W' by a certain distance D1', and then moves farther from the wall 'W'. At this time, at the cleaning track 'CT' that is formed in a zigzag manner, the certain distance 'D1' in between the tracks may be equal to or less than the width of the body 101 (FIG. 2) of the cleaning robot 100. As described on FIG. 9, the above is because the width of the space to be cleaned, that is, the 'CR' on FIG. 9, at which the cleaning robot 100 performs a cleaning is similar to the width of the body 101 (FIG. 2) of the cleaning robot 100. In other words, in the general cleaning mode, in an embodiment in which the cleaning robot 100 performs a cleaning along the cleaning track formed in a zigzag manner, the cleaning robot 100 generates the cleaning track on the basis of the width of the body 101 (FIG. 2) of the cleaning robot 100.

The cleaning robot 100 moves along the cleaning track 'CT' and scouts for the dust 'Du' on the floor to be cleaned (315), and determines whether the dust 'Du' is detected on the floor to be cleaned (320). In detail, the cleaning robot 100 obtains an image of the floor to be cleaned by using the floor image obtaining unit 140, and by analyzing the obtained image of the floor to be cleaned, determines whether the dust 'Du' is detected from the floor to be cleaned, and calculates the position at which the dust 'Du' is detected in an embodiment in which the dust 'Du' is detected.

When the dust 'Du' is not detected ('NO' from 320), the cleaning robot 100 determines whether the cleaning with respect to the corresponding space to be cleaned is completed (325). When the cleaning with respect to the corresponding space to be cleaned is completed ('YES' from 325), the cleaning robot 100 moves to another space to be cleaned, or completes a cleaning. When the cleaning with respect to the corresponding space to be cleaned is not completed ('NO' from 325), the cleaning robot 100 continues to scout for the dust 'Du' while continuing the cleaning along the cleaning track 'CT'.

When the dust 'Du' is detected on the floor to be cleaned ('YES' from 320), the cleaning robot 100 moves toward the dust (330). Since the cleaning robot 100 is provided with the vision 'V' that is wider than the area at which a cleaning is performed by the cleaning robot 100, the cleaning robot 100 may be able to detect the dust 'Du' positioned out of the cleaning track 'CT' as illustrated on FIG. 11B. When the dust 'Du' is detected, the cleaning robot 100 moves to the position at which the dust 'Du' is detected, as illustrated on FIG. 11C.

At this time, when the detected dust 'Du' is far from the cleaning robot 100, the cleaning robot 100 is not instantly moved to the position of the dust 'Du', but may continue to move along the cleaning track. Then, when the cleaning robot 100 is near the position of the dust 'Du', the cleaning robot 100 may move to the position of the dust 'Du' by diverging from the cleaning track. In detail, the cleaning robot 100 estimates the distance between the detected dust 'Du' and the cleaning robot 100, and may move to the position of the dust 'Du' when the estimated distance is less than a certain distance. In addition, when the dust 'Du' is positioned at a lower portion from the center of the floor image obtained by the floor image obtaining unit 140, the cleaning robot 100 may move to the position of the dust 'Du', as the cleaning robot 100 may be able to determine that the distance from the cleaning robot 100 to the dust 'Du is near when the dust 'Du' is positioned at a lower portion of the center of the floor image obtained by the floor image obtaining unit 140.

Then, the cleaning robot 100 determines whether the cleaning robot 100 is arrived at the position at which the dust 'Du' is detected (335), and performs a concentrated cleaning when arrived ('YES" from 335) at the position at which the dust 'Du' is detected (340). For example, the cleaning robot 100 may perform a cleaning with respect to the position at which the dust 'Du' is detected while moving along a spiral moving track.

At this time, the cleaning robot 100 may perform a cleaning in a different pattern depending on the amount of the dust detected. For example, when the amount of the dust detected is large, the cleaning robot 100 may move along the moving track formed in a spiral manner or formed in a circular manner to perform a cleaning, and when the amount of the dust detected is small, the cleaning robot 100 may perform a cleaning on the detected dust by passing through the detected position of the dust. In addition, during the concentrated cleaning, the cleaning robot 100 may supply a large driving current to the brush motor 173 (FIG. 2) that drives the main brush 172 (FIG. 2) of the cleaning unit 17 to increase the torque of the main brush 172 (FIG. 2), or may increase the rotational speed of the main brush 172 (FIG. 2).

In addition, the cleaning robot 100 may increase the suction force of a dust suction pump (not shown) configured to suction dust.

When the concentrated cleaning is completed, the cleaning robot 100 returned to an original cleaning track (345). In detail, as illustrated on FIG. 11D, the cleaning robot 100 moves along the opposite track with respect to the track along which the cleaning robot 100 has moved to the position at which the dust 'Du' is detected as to return to the original cleaning track 'CT' formed in a zigzag manner, and performs a cleaning by moving along the cleaning track 'CT' formed in a zigzag manner.

Figure 12A:
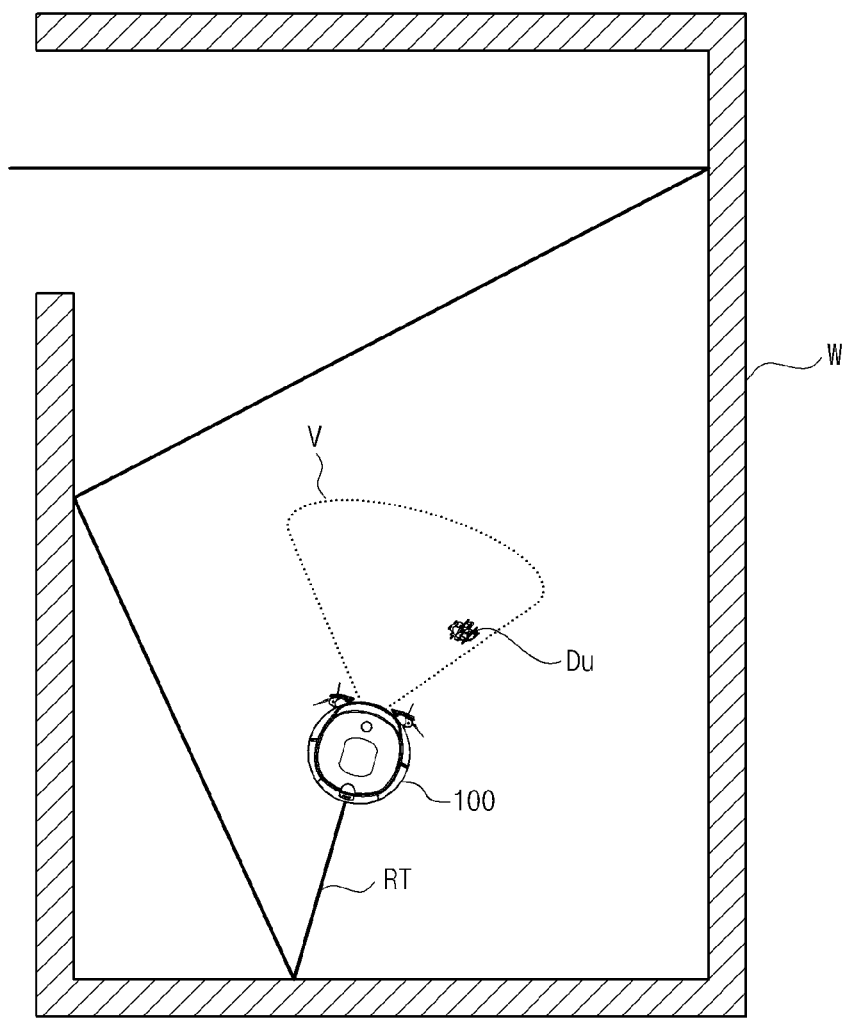
FIGS. 12A and 12B are drawings illustrating one example of the cleaning robot performing a cleaning on a floor to be cleaned while moving along a cleaning track in accordance with an embodiment.
Figure 12B:
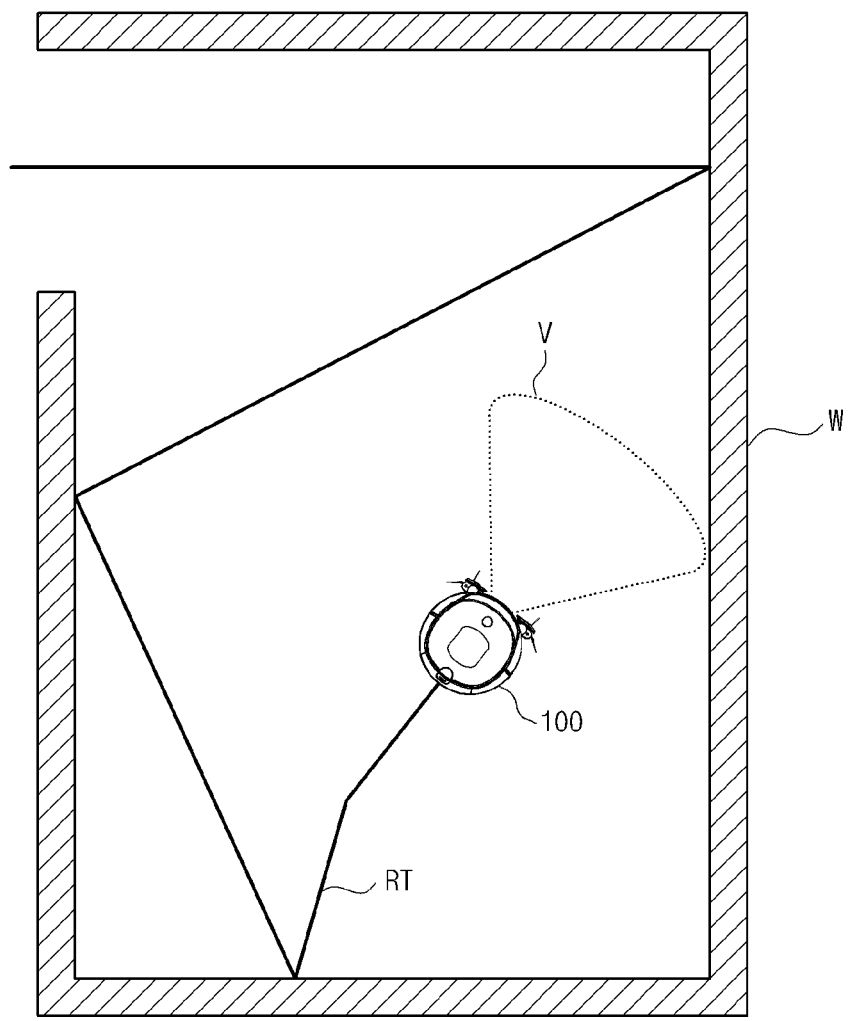

FIGS. 12A and 12B are drawings illustrating one example of the cleaning robot performing a cleaning on a floor to be cleaned while moving along a cleaning track in accordance with an embodiment.

By referring to FIG. 10, and FIGS. 12A and 12B, the cleaning robot 100 may be able to perform a cleaning while moving along a predetermined cleaning track 'RT'. As illustrated on FIG. 12A, for example, the cleaning robot 100 that is entered into an space to be cleaned moves in a straight manner until the cleaning robot 100 is near an obstacle or a wall 'W', and when the distance from the cleaning robot 100 to the obstacle or the wall 'W' is less than a certain distance, the cleaning robot 100 rotates toward a random direction and may move in a straight manner until the cleaning robot 100 is near an obstacle or a wall 'W' again.

While moving along the random cleaning track 'RT', the cleaning robot 100 performs a cleaning with respect to the floor to be cleaned, and by obtaining an image of the floor to be cleaned and by analyzing the image, the cleaning robot 100 scouts for dust. In addition, when dust is detected while moving along the random cleaning track 'RT', the cleaning robot 100 changes the moving direction thereof to move toward the dust to perform a concentrated cleaning. After completing the concentrated cleaning, the cleaning robot 100 moves along the random cleaning track 'RT' by moving again toward a random direction.

In the general cleaning mode, examples are illustrated of the cases when the cleaning robot 100 moves along the cleaning track 'CT' formed in a zigzag manner and along the random cleaning track 'RT', but the such are only examples, and the cleaning robot 100 may be able to perform a cleaning while moving along various cleaning tracks.

Next, the operation of the cleaning robot 100 in the scouting mode will be described. When the cleaning robot 100 performs a cleaning again after cleaning a space to be cleaned in the general cleaning mode, the space to be cleaned is not needed to be carefully cleaned as in the general cleaning mode, and the cleaning may be performed in a way to clean the dust scattered at a few number of places. When the cleaning robot 100 performs a cleaning again after performing a cleaning in the general cleaning mode, the cleaning robot 100 may scout for dust as to increase efficiency and when the dust is detected, the cleaning robot 100 may move to the position at which the dust is detected to remove the dust.

Figure 13:
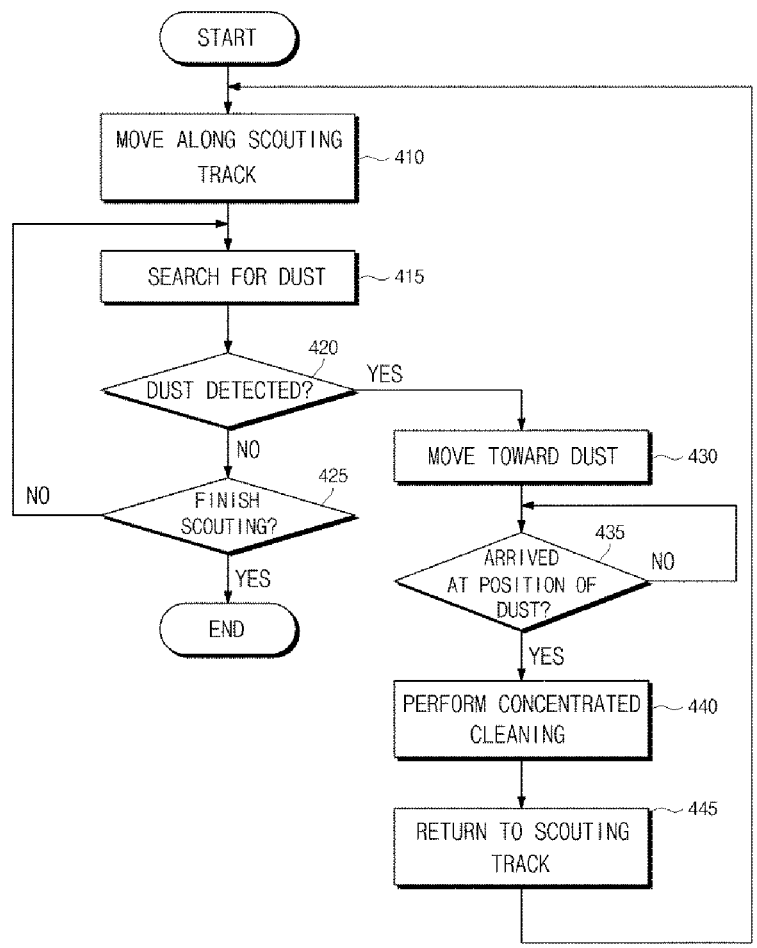
FIG. 13 is a flow chart illustrating one example of the cleaning robot performing a cleaning on a floor to be cleaned while moving along a scouting track in accordance with an embodiment.
Figure 14A:
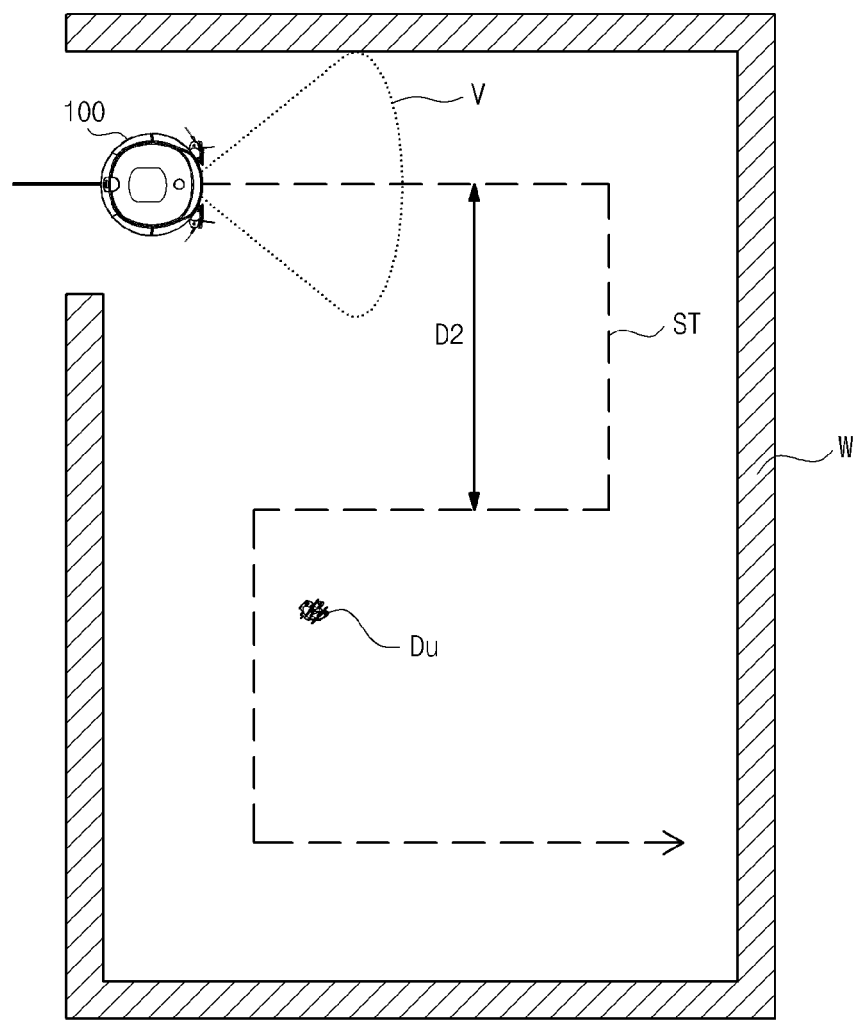
FIGS. 14A to 14D are drawings illustrating one example of the cleaning robot performing a cleaning on a floor to be cleaned while moving along a scouting track in accordance with an embodiment.
Figure 14B:
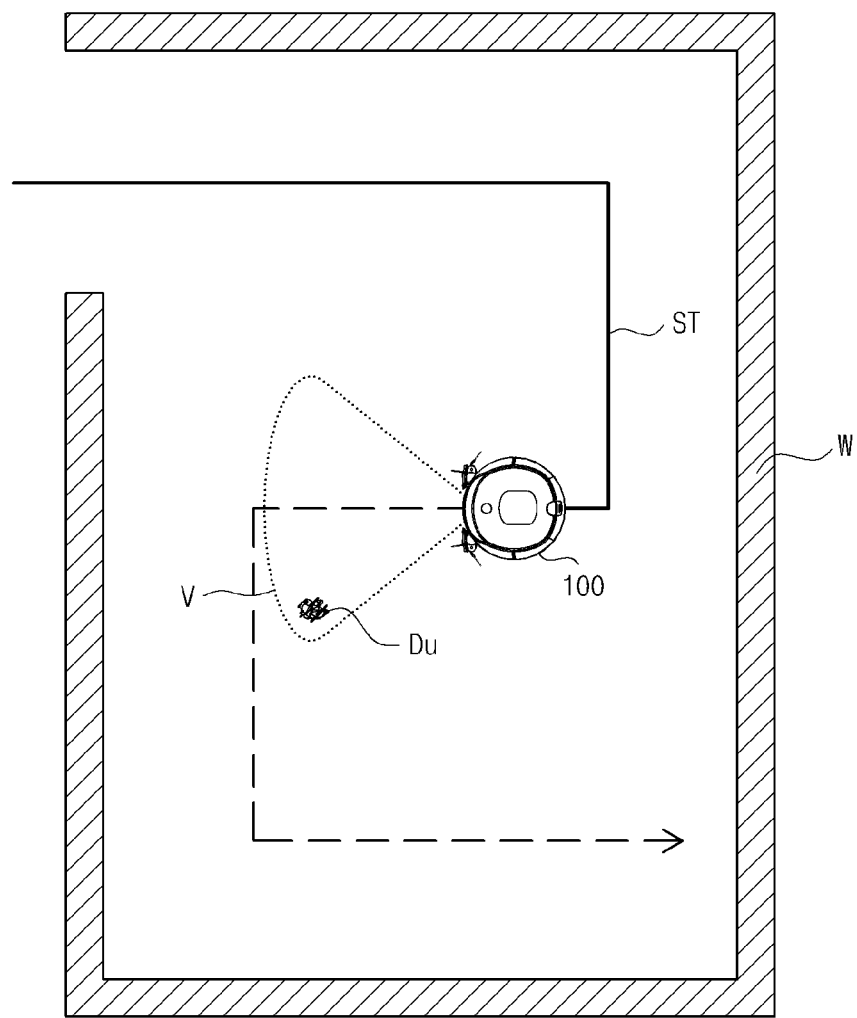
Figure 14C:
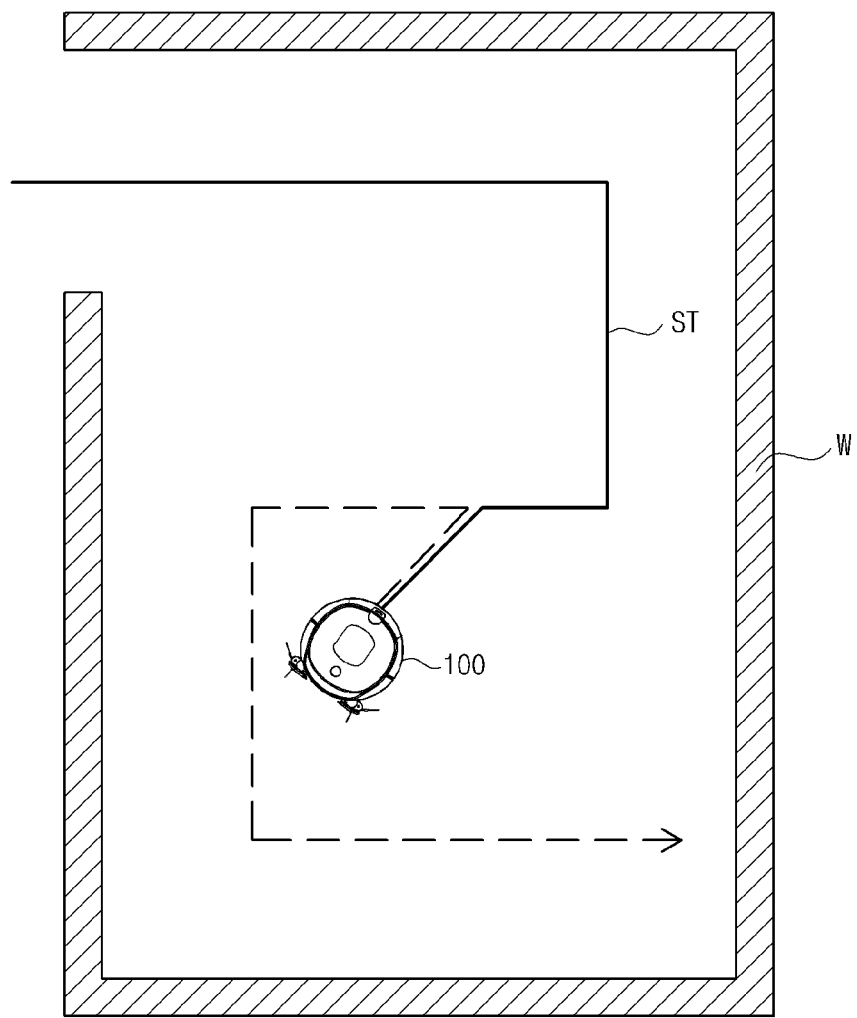
Figure 14D:
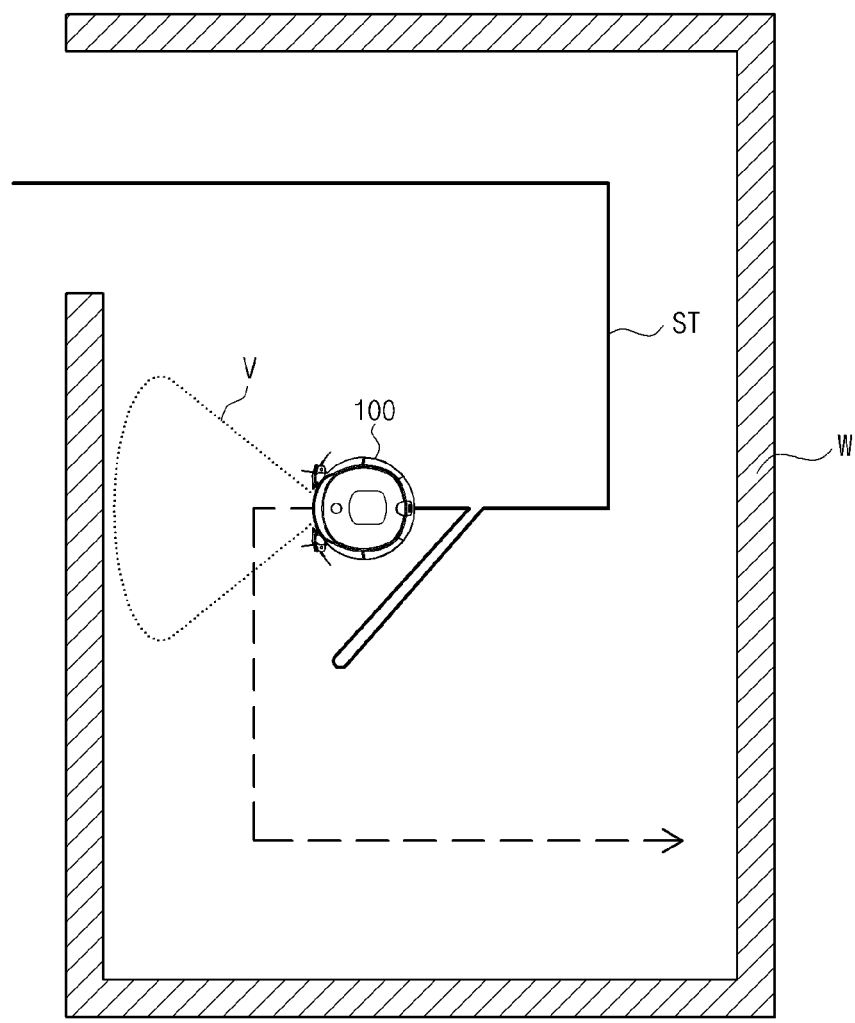

FIG. 13 is a drawing illustrating one example of the cleaning robot performing a cleaning on a floor to be cleaned while moving along a scouting track in accordance with an embodiment, and FIGS. 14A to 14D are drawings illustrating one example of the cleaning robot performing a cleaning on a floor to be cleaned while moving along the scouting track in accordance with an embodiment.

By referring to FIG. 13 and FIGS. 14A to 14D, the cleaning robot 100 moves along the predetermined scouting track (410). Differently from the general cleaning mode, in the scouting mode, the cleaning robot 100 may not perform a cleaning if no cleaning is needed. As illustrated on FIG. 14A, for example, the cleaning robot 100 that is entered into a space to be cleaned moves along a scouting track 'ST' formed in a zigzag manner. At this time, a distance 'D2' in between the scouting tracks 'ST' formed in a zigzag manner may be equal to or less than the width of the vision 'V' of the cleaning robot 100. In the scouting mode, the cleaning robot 100 is only need to detect the dust 'Du', and this the cleaning robot 100 is not needed to move in the distance 'D1' (FIG. 11A), which is narrow, as in the general cleaning mode. In other words, the cleaning robot 100 in the scouting mode may generate the scouting track on the basis of the vision of the floor image obtaining unit 140.

In addition, an example is illustrated when the cleaning robot 100 moves along the scouting track 'ST' formed in a zigzag manner, but the example as such is only an example, and the cleaning robot 100 may be able to perform a cleaning while moving along various scouting tracks. For example, in the scouting mode, the cleaning robot 100 may move along a scouting track formed in a spiral manner in which the cleaning robot 100 moves while maintaining a first distance, for example, a half of the vision 'V' of the cleaning robot 100, with respect to the wall 'W' in a constant manner, and when returned to the initial position, the cleaning robot 100 may be able to move while maintaining a second distance, that is, the distance larger than the first distance, with respect to the wall 'W'. In addition, the cleaning robot 100 may move along a random scouting track in which the cleaning robot 100 moves in a straight manner toward a random direction and when nearing to the wall 'W', may turn toward a random direction and then move again in a straight manner.

The cleaning robot 100 scouts (415) the dust 'Du' on a floor to be cleaned while moving along the scouting track 'ST' formed in a zigzag manner, and determines (420) whether the dust 'Du' is detected from the floor to be cleaned. In detail, the cleaning robot 100 obtains an image of the floor to be cleaned by using the floor image obtaining unit 140, and by analyzing the image of the floor to be cleaned, the cleaning robot 100 determines whether the dust 'Du' is detected from the floor to be cleaned, and when the dust 'Du' is detected, the position at which the dust 'Du' is detected is calculated.

When the dust 'Du' is not detected from the floor to be cleaned ('NO' from 420), the cleaning robot 100 determines (425) whether the scouting with respect to the corresponding floor to be cleaned is completed. When the scouting with respect to the corresponding floor to be cleaned is completed ('YES' from 425), the cleaning robot 100 moves to another space to be cleaned, or the scouting is completed. When the scouting with respect to the corresponding floor to be cleaned is not completed ('NO' from 425), the cleaning robot 100 keeps moving along the scouting track 'ST' to scout for the dust 'Du'.

When the dust 'Du' is detected ('YES' from 420), the cleaning robot 100 moves toward the dust (430). As illustrated on FIG. 14B, for example, when the dust 'Du' is positioned within the vision 'V' of the cleaning robot 100, the cleaning robot 100 may be able to detect the dust 'Du'. In addition, as illustrated on FIG. 14C, when the dust 'Du' is detected, the cleaning robot 100 moves to the position at which the dust 'Du' is detected.

At this time, when the detected dust 'Du' is distant from the cleaning robot 100, the cleaning robot 100 is not instantly moved to the position of the dust 'Du' but may be able to continue moving along the cleaning track. Later, when the cleaning robot 100 is near the position, that is, the position of the dust 'Du' stored in the cleaning robot 100, the cleaning robot 100 may diverge from the cleaning track at which the cleaning robot 100 is in operation to move to the position of the dust 'Du'.

Then, the cleaning robot 100 determines (435) whether the cleaning robot 100 is arrived at the position at which the dust is detected, and when the cleaning robot 100 is arrived at the position at which the dust is detected, the cleaning robot 100 performs a concentrated cleaning (440). For example, the cleaning robot 100 arrived at the position at which the dust is detected moves along the moving track formed in a spiral manner and may perform a cleaning with respect to the position at which the dust is detected. At this time, the cleaning robot 100 may perform a different pattern of cleaning depending on the amount of the dust detected. While performing the concentrated cleaning, the cleaning robot 100 may move along the moving track formed in a spiral manner, or may increase the torque of the main brush 172 (FIG. 3) or increase the rotating speed of the main brush 172 (FIG. 3).

When the concentrated cleaning is completed, the cleaning robot 100 returns to the original scouting track (445). As illustrated on FIG. 14D, in detail, the cleaning robot 100 moves along an opposite track with respect to the track along which the cleaning robot 100 has moved to the position at which the dust 'Du' is detected, and is returned to the original scouting track that is formed in a zigzag manner, as to continue the operation along the scouting track 'ST' formed in a zigzag manner.

However, when the cleaning robot 100 moves along a random scouting track, the cleaning robot 100 completes the concentrated cleaning and may move toward a random direction.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A cleaning robot, comprising:
   a body,
   a moving unit which moves the body in a cleaning space,
   a cleaning unit which cleans the cleaning space,
   an image obtaining unit which obtains an image of the cleaning space, and
   a control unit:
      which is coupled to the moving unit, the cleaning unit and the image obtaining unit,
      which generates a moving track based on a width of a field of view of the image obtaining unit and moves the body along the moving track,
      which moves the body from a diverging position on the moving track to a position of a foreign substance when the foreign substance on a floor area of the cleaning space outside the moving track is detected based on the obtained image while moving the body,
      which cleans the foreign substance when the body arrives at the position of the foreign substance, and
      which moves the body back to the diverging position on the moving track and moves along the moving track.

2. The cleaning robot of claim 1, wherein:
   the control unit extracts an image of the floor area from the image, and extracts an image of the foreign substance from the extracted image of the floor area.

3. The cleaning robot of claim 2, wherein:
the control unit extracts the image of the floor area from the image by using a watershed algorithm that uses a marker.

4. The cleaning robot of claim 2, wherein:
the control unit extracts the image of the foreign substance from the image of the floor area by using an edge extracting algorithm.

5. The cleaning robot of claim 1, wherein:
during a cleaning mode, the control unit generates the moving track based on a width of the body, moves the body along the moving track, controls the image obtaining unit and the cleaning unit to obtain the image and clean the floor area of the cleaning space while the body is moving.

6. The cleaning robot of claim 1, wherein:
the control unit controls the moving unit and the cleaning unit to perform a concentrated cleaning on the position of the foreign substance at the time of arrival of the cleaning robot at the position of the foreign substance.

7. The cleaning robot of claim 1, wherein:
the control unit controls the moving unit to move the body to the position of the foreign substance when a distance between the body and the foreign substance is equal to or less than a predetermined distance.

8. A method of controlling a cleaning robot including an image obtaining unit which obtains an image of a cleaning space, the method comprising:
generating a moving track based on a width of a body of the cleaning robot and moving the cleaning robot along the moving track while cleaning, obtaining an image of a floor area of the cleaning space while moving the cleaning robot in the cleaning space,
detecting a foreign substance on the floor area of the cleaning space outside the moving track based on the obtained image while moving the cleaning robot along the moving track,
generating a scouting track based on a width of a field of view of the image obtaining unit, different from the moving track, towards a position of the foreign substance,
moving the cleaning robot from a diverging position on the moving track to the position of the foreign substance along the scouting track,
cleaning the foreign substance when the cleaning robot arrives at the position of the foreign substance, and
moving the cleaning robot back to the diverging position on the moving track and continuing along the moving track.

9. The method of claim 8, wherein:
the moving of the cleaning robot to the position of the foreign substance comprises moving the cleaning robot to the position of the foreign substance when a distance between the cleaning robot and the foreign substance is equal to or less than a predetermined distance.

10. The method of claim 8, wherein:
the detecting of the foreign substance on the floor area of the cleaning space comprises extracting the image of the floor area from the image of the cleaning space, and extracting an image of the foreign substance from the extracted image of the floor area.

11. The method of claim 10, wherein:
the extracting of the image of the floor area comprises extracting the floor area from the floor image by using a watershed algorithm that uses a marker.

12. The method of claim 10, wherein:
the extracting of the image of the foreign substance comprises extracting the image of the foreign substance by using an edge extracting algorithm.

13. A cleaning robot, comprising:
a body;
a moving unit which moves the body;
a cleaning unit which is provided on the body which cleans a cleaning space;
an image obtaining unit which is provided on the body and which obtains an image of the cleaning space; and
a control unit:
which generates a first track based on a width of a field of view of the image obtaining unit, and moves the body along the first track,
which generates a second track from a diverging position on the first track to a position of a foreign substance and moves the body along the second track, when the foreign substance on a floor area of the cleaning space outside the first track is detected based on the obtained image while moving the body,
which cleans the foreign substance when the body arrives at the position of the foreign substance, and
which moves the body back to the diverging position on the first track and moves along the first track.

14. The cleaning robot of claim 13, wherein:
when the body arrives at the position of the foreign substance, the cleaning unit cleans the detected foreign substance.

15. The cleaning robot of claim 13, wherein:
during a cleaning mode, the control unit generates the first track based on a width of the body and moves the body along the first track, and the cleaning unit cleans the cleaning space while the body is moving along the first track.

16. The cleaning robot of claim 1, wherein:
when the foreign substance is detected, if the foreign substance detected is more than a predetermined distance from the cleaning robot, the control unit controls the moving unit to move the body along the cleaning track until the distance between the cleaning robot and the foreign substance is less than or equal to the predetermined distance,
the control unit controls the moving unit to move the body to the position of the foreign substance when a distance between the body and the foreign substance is equal to or less than the predetermined distance, and
the control unit controls the moving unit and the cleaning unit to perform a concentrated cleaning on the position of the foreign substance at the time of arrival of the cleaning robot at the position of the foreign substance.

* * * * *